US010306083B2

(12) United States Patent
Okamoto et al.

(10) Patent No.: US 10,306,083 B2
(45) Date of Patent: May 28, 2019

(54) IMAGE PROCESSING SYSTEM, IMAGE PROCESSING DEVICE, NON-TRANSITORY COMPUTER READABLE RECORDING MEDIUM, AND PROCESSING DEVICE FOR WIRELESS COMMUNICATION WITH A PORTABLE TERMINAL

(71) Applicant: Konica Minolta, Inc., Tokyo (JP)

(72) Inventors: Yuji Okamoto, Hyogo (JP); Junichi Hase, Osaka (JP); Nobuhiro Mishima, Osaka (JP); Hidetaka Iwai, Hyogo (JP); Daisuke Nakano, Hyogo (JP); Hirokazu Kubota, Shiga (JP); Hideaki Soejima, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 97 days.

(21) Appl. No.: 14/791,077

(22) Filed: Jul. 2, 2015

(65) Prior Publication Data
US 2016/0006902 A1 Jan. 7, 2016

(30) Foreign Application Priority Data

Jul. 2, 2014 (JP) .................................. 2014-136676

(51) Int. Cl.
H04N 1/333 (2006.01)
H04N 1/00 (2006.01)

(52) U.S. Cl.
CPC ... *H04N 1/00342* (2013.01); *H04N 2201/006* (2013.01); *H04N 2201/0072* (2013.01); *H04N 2201/0075* (2013.01)

(58) Field of Classification Search
None
See application file for complete search history.

(56) References Cited

U.S. PATENT DOCUMENTS 9,578,607 B2 * 2/2017 Nobukiyo ............ H04W 16/32
2005/0065894 A1 * 3/2005 Inaba .................... G06K 15/00
705/400

(Continued)

FOREIGN PATENT DOCUMENTS

JP 2007-304981 A 11/2007
JP 2012-182568 A 9/2012

Primary Examiner — Neil R McLean
Assistant Examiner — Pawan Dhingra
(74) Attorney, Agent, or Firm — Osha Liang LLP

(57) ABSTRACT

An image processing system includes a first image processing device including a first processor. The first processor executes a process including: detecting a change in a load status at the first image processing device; sending a request for information relating to a load status at the second image processing device to the second image processing device when the change in the load status at the first image processing device is detected; analyzing the information relating to the load status at the second image processing device, and determining whether or not the first image processing device establishes wireless communication with a portable terminal; and adjusting to relatively lower a radio field strength from the first image processing device below the radio field strength from the second image processing device when the first image processing device determines not to establish wireless communication with the portable terminal.

24 Claims, 15 Drawing Sheets

(56) References Cited

U.S. PATENT DOCUMENTS

| | | | | |
|---|---|---|---|---|
| 2005/0164709 | A1* | 7/2005 | Balasubramanian | H04L 47/10 455/453 |
| 2006/0189317 | A1* | 8/2006 | Nakano | H04W 64/00 455/436 |
| 2007/0189243 | A1* | 8/2007 | Wang | H04L 47/10 370/338 |
| 2009/0318160 | A1* | 12/2009 | Li | H04W 48/20 455/453 |
| 2011/0292445 | A1* | 12/2011 | Kato | G06F 3/1222 358/1.15 |
| 2014/0365306 | A1* | 12/2014 | Ota | G06Q 30/0261 705/14.58 |

* cited by examiner

IMAGE PROCESSING SYSTEM 5

FIG. 3

NECESSARY STRENGTH INFORMATION 25

| RADIO FIELD STRENGTH RECEIVED FROM PORTABLE TERMINAL | NECESSARY RADIO FIELD STRENGTH EMITTED FROM IMAGE PROCESSING DEVICE |
|---|---|
| 1 | 10 |
| 2 | 8 |
| 3 | 5 |
| 4 | 3 |
| 5 | 1 |

PRIORITY CONDITION TABLE 50

| PRIORITY CONDITION | DETAILS | ON/OFF |
|---|---|---|
| JOB EXECUTION WAITING TIME | EXTRACT IMAGE PROCESSING DEVICE HAVING SHORTEST JOB EXECUTION WAITING TIME | ON |
| NUMBER OF WAITING JOB | EXTRACT IMAGE PROCESSING DEVICE HAVING LEAST NUMBER OF WAITING JOB | OFF |
| NUMBER OF CONNECTING PORTABLE TERMINAL | EXTRACT IMAGE PROCESSING DEVICE CONNECTING TO LEAST NUMBER OF PORTABLE TERMINAL | OFF |

IMAGE PROCESSING SYSTEM, IMAGE PROCESSING DEVICE, NON-TRANSITORY COMPUTER READABLE RECORDING MEDIUM, AND PROCESSING DEVICE FOR WIRELESS COMMUNICATION WITH A PORTABLE TERMINAL

This application is based on Japanese Patent Application No. 2014-136676 filed in Japan on Jul. 2, 2014, the contents of which are hereby incorporated by reference.

BACKGROUND

Field of the Invention

One or more embodiments of the present invention relate to an image processing system, an image processing device, a non-transitory computer readable recording medium and a processing device. More specifically, one or more embodiments of the present invention relate to a technique of establishing wireless communication via radio waves with a portable terminal.

Description of the Background Art

Image processing devices including MFPs (Multi-Functional Peripherals) equipped with functions such as print function and scan function are generally used with network access, and capable of receiving jobs such as a print job over the network. The image processing device establishes wireless communication with a portable terminal such as a tablet terminal or a smart phone, for instance, thereby receiving and executing the job from the portable terminal. Moreover, as systems using such wireless communication, some systems are provided. On such systems, for example, the image processing device emits the radio waves around, and the portable terminal catches the radio waves, so that the portable terminal is allowed to automatically connect to the image processing device. With this system, even when a user moves around with carrying the portable terminal, the portable terminal catches the radio waves from the image processing device which is placed near the user so that the portable terminal is allowed to automatically connect to the image processing device. As a result, the user, for example, uses the portable terminal to send the print job, for instance, to the near image processing device, thereby obtaining a printed output produced by the image processing device.

When the image processing device and the portable terminal automatically connect to each other as described above, the portable terminal automatically connects to the image processing device which emits the highest-intensity radio waves. Sometimes the portable terminal may automatically connect to the busy image processing device that may have many waiting jobs. If the job is sent to such image processing device to which the portable terminal is automatically connected, it takes long time for the job to be executed, resulting in inefficient image processing.

A technique to select the image processing device by preventing an access to the busy device is introduced (as described for example in Japanese Patent Application Laid-Open No. 2012-182568). According to the aforementioned disclosed technique, a karaoke device has an access status from a remote control terminal at each access point, and orders the access point to access to each remote control terminal, thereby adjusting the number of accesses at each access point and avoiding the peak. The wireless communication between the image processing device and the portable terminal, however, is based on the premise that the user carries the portable terminal moves around. If the user moves, the access to each image processing device frequently changes. With the aforementioned disclosed technique, the adjustment operation of the accesses performed at each image processing device may be extremely complicated. Moreover, according to the aforementioned disclosed technique, the remote control terminal accesses the karaoke device, and the karaoke device gives an instruction to the remote control device regarding the access point that should be accessed. Furthermore, according to the aforementioned disclosed technique, it is necessary for the portable device to access the image processing device first. When the image processing device to which the portable terminal accessed at first is busy, the user is required to access again another image processing device from the image processing device.

SUMMARY

One or more embodiments of the present invention provide an image processing system, an image processing device, a non-transitory computer readable recording medium and a processing device capable of allowing a portable terminal to automatically connect to the image processing device at which an efficient image processing can be performed for automatic connection to the image processing device.

One or more embodiments of the present invention are directed to an image processing system comprising a first image processing device that establishes wireless communication via radio waves with a portable terminal and a second processing device that establishes wireless communication via the radio waves with the portable terminal, and communicates with the first image processing.

According to one aspect of this invention, the image processing system is configured as follows. The first image processing device includes a first processor. The first processor executes a process includes: detecting a change in a load status at the first image processing device; sending a request for information relating to a load status at the second image processing device to the second image processing device when the change in the load status at the first image processing device is detected; analyzing the information relating to the load status at the second image processing device obtained in response to the request to the second image processing device, and determining whether or not the first image processing device establishes wireless communication with the portable terminal; and adjusting to relatively lower a radio field strength from the first image processing device below the radio field strength from the second image processing device when the first image processing device determines not to establish wireless communication with the portable terminal. The second image processing device includes a second processor. The second processor notifies the first image processing device of the information relating to the load status at the second image processing device in response to the request from the first image processing device.

Second, the present invention is intended for an image processing device capable of establishing wireless communication via radio waves with a portable terminal comprising a processor.

According to an aspect of the image processing device, the processor executes a process includes: detecting a change in a load status at the image processing device; sending a request for information relating to a load status at another image processing device to the another image processing device when the change in the load status at the image processing device is detected; analyzing the information relating to the load status at the another image processing device obtained from the another image processing device in response to the request, and determining whether or not the image processing device establishes wireless communication with the portable terminal; and adjusting to relatively lower a radio field strength from the image processing device below the radio field strength from the another image processing device when the image processing device determines not to establish wireless communication with the portable terminal.

Third, the present invention is intended for a non-transitory computer readable recording medium in which a computer program to be executed by an image processing device capable of establishing wireless communication via radio waves with a portable terminal and communicating with another image processing device which is capable of establishing wireless communication via radio waves with the portable terminal is stored.

According to an aspect of the non-transitory computer readable recording medium, execution of the program by the image processing device causing the image processing device to execute the steps of: communicating with the portable terminal; detecting a change in a load status at the image processing device; obtaining information relating to a load status at the another image processing device when the change in the load status at the image processing device is detected; analyzing the information relating to the obtained load status at the another image processing device, and determining whether or not to communicate with the portable terminal; and adjusting to relatively lower a radio field strength from the image processing device below the radio field strength from the another image processing device in response to determining not to communicate with the portable terminal.

Fourth, the present invention is intended for a processing device.

According to an aspect of the processing device, the processing device comprises: a processor; and a communication interface for communication with multiple image processing devices capable of establishing wireless communication via radio waves with a portable terminal. The processor executes a process includes: receiving load statuses at the multiple image processing devices via the communication interface; determining one of the multiple image processing devices that communicates with the portable terminal based on the received load statuses at the multiple image processing devices; determining target values which make the radio field strength from the image processing device determined to communicate with the portable terminal relatively higher than the radio field strengths from rest of the multiple image processing devices for each of the multiple image processing devices; and notifying the multiple image processing devices of the respective determined target values, and modifying the radio field strengths from the multiple image processing devices.

Fifth, the present invention is intended for a non-transitory computer readable recording medium in which a computer program to be executed by a processing device capable of communicating with multiple image processing devices that establish wireless communication via radio waves with a portable terminal with each other is stored.

According to an aspect of the non-transitory computer readable recording medium, execution of the program by the processing device causing the processing device to execute the steps of: receiving load statuses at the multiple image processing devices; determining one of the multiple image processing devices that communicates with the portable terminal based on the received load statuses at the multiple image processing devices; determining target values which make the radio field strength from the image processing device determined to communicate with the portable terminal relatively higher than the radio field strengths from rest of the multiple image processing devices for each of the multiple image processing devices, notifying the multiple image processing devices of the respective determined target values, and modifying the radio field strengths from the multiple image processing devices.

BRIEF DESCRIPTION OF THE DRAWINGS

FIG. 3 shows an example of necessary strength information stored on the first image processing device;

FIG. 11 shows an example of a priority condition table of the second embodiment;

DETAILED DESCRIPTIONS

Embodiments of the present invention will be described in detail below. Common components are identified by like reference numbers and will not be discussed repeatedly for the sake of brevity.

First Embodiment

Figure 1:
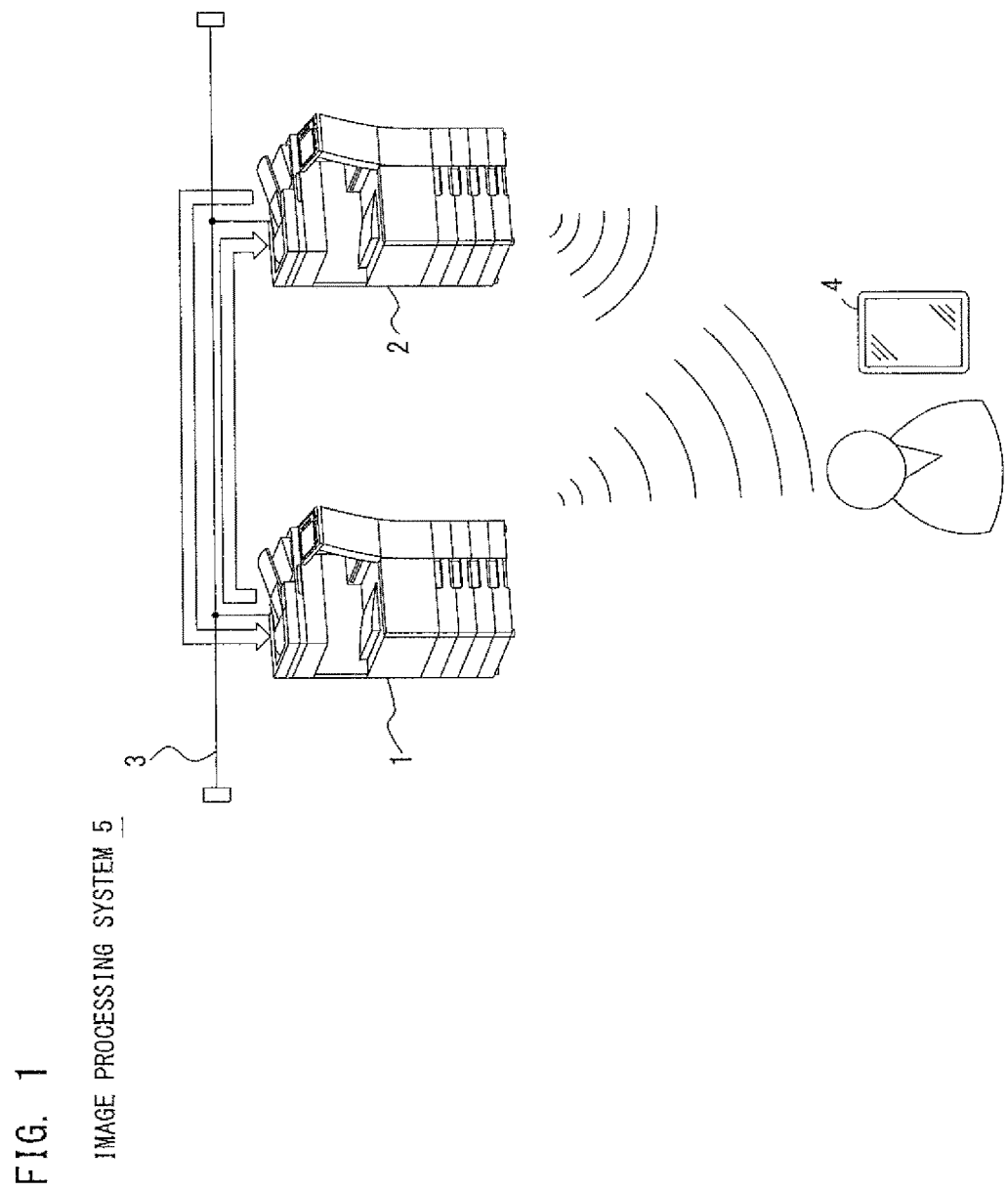
FIG. 1 shows an example of the structure of an image processing system.

FIG. 1 shows an example of the structure of an image processing system 5. The image processing system 5 includes a first image processing device 1, a second image processing device 2 and a network 3 formed from a LAN which allows communication of the first image processing device 1 and the second image processing device 2. Each of the first image processing device 1 and the second image processing device 2 is, for example, constructed by one of MFPs (Multi-functional Peripherals) equipped with an image processing function such as a print function and/or a scan function. The first image processing device 1 and the second image processing device 2 are capable of executing jobs received over the network 3. Each of the first image processing device 1 and the second image processing device 2 is equipped with a wireless communication function using radio waves from Bluetooth (trademark) or WiFi, for example. The first image processing device 1 and the second image processing device 2 emit radio waves around with the wireless communication function, thereby communicating over a radio with a portable terminal 4 carried by a user. The first image processing device 1 and the second image processing device 2 are also capable of receiving the job from the portable device 4 through wireless communication and executing the job. The communication between the first image processing device 1 and the second image processing device 2 is established over the network 3, for instance. The communication between the first image processing device 1 and the second image processing device 2, however, may be established via radio waves.

The portable terminal 4 is constructed by, for instance, a smartphone, a tablet terminal or a personal computer (PC), and is equipped with the wireless communication function using radio waves from Bluetooth (trademark) or WiFi, for example like the first image processing device 1 and the second image processing device 2. The portable terminal 4 receives the radio waves emitted from the first and the second image processing devices 1 and 2, thereby automatically connecting to the first and the second image processing devices 1 and 2. It is assumed, for example, the portable terminal 4 receives multiple radio waves emitted from each of the first and second image processing devices 1 and 2. In this case, the portable terminal 4 automatically connects to the image processing device which emits the highest-intensity radio. As the portable terminal 4 is connecting to the first image processing device 1 or the second image processing device 2, the user is allowed to operate the portable terminal 4 to send the job to the image processing device. In response to receiving the job from the portable terminal 4, the first image processing device 1 or the second image processing device 2 executes the received job.

On the above-described image processing system 5, multiple portable terminals 4 automatically connect to the first image processing device 1 which emits the high-intensity radio when the first image processing device 1 emits the higher-intensity radio than the second image processing device 2. According to the first embodiment, in order to prevent concentration of the jobs at the first image processing device 1, the first and second image processing devices 1 and 2 communicate with each other and adjust balance of radio field strengths from the first image processing device 1 and from the second image processing device 2 so that the job may be executed efficiently. Such image processing system 5 is described in detail below. An example when the first image processing device 1 as a leading position communicates with the second image processing device 2 and adjusts the relative radio field strengths from the first and second image processing devices 1 and 2 is explained in below.

When the load applied to the first image processing device 1 changes, the first image processing device 1 detects the change. The first image processing device 1 may have some kind of change such as receiving the job or have an increase in the number of portable terminal 4 to which it is connecting via a radio. In this case, the first image processing device 1 detects that its load status is changed.

After detecting the change in its load status, the first image processing device 1 obtains information relating to a load status at the second image processing device 2 from the second image processing device 2. More specifically, the first image processing device 1 sends a request for load status information to the second image processing device 2 over the network 3. The load status information includes, for example, the number of the waiting job at the second image processing device 2, time required from receipt to execution of the job and the number of the connecting portable terminal 4. The first image processing device 1 also requests for information relating to the current radio field strength from the second image processing device 2.

In response to receiving the request from the first image processing device 1, the second image processing device 2 checks, for example, the number of the waiting job at the second image processing device 2, the time required from receipt to execution of the job, the number of the connecting portable terminal 4 and the current radio field strength. The second image processing device 2 then sends the requested load status information and the information of the radio field strength to the first image processing device 1 over the network 3.

After receiving the load status information of the second image processing device 2, the first image processing device 1 analyzes the received information. The first image processing device 1 determines whether or not to establish new communication with the portable terminal 4 from this point of time based on the analysis result. The first image processing device 1, for instance, identifies the load status at the second image processing device 2 based on the load status information of the second image processing device 2. The first image processing device 1 compares its load status and that of the second image processing device 2. Less load may be applied to its device than the second image processing device 2. In this case, the first image processing device 1 determines to establish new communication with the portable terminal 4 from this point of time. The heavier load may be applied to its device than the second image processing device 2. In this case, the first image processing device 1 determines not to establish new communication with the portable terminal 4 from this point of time.

When the first image processing device 1 determines not to establish new communication with the portable terminal 4, it adjusts to relatively lower the radio field strength from the first image processing device 1 below that from the second image processing device 2. As a way of adjusting the radio field strengths, the first image processing device 1 may lower the radio field strength from the first image processing device 1 below the current radio field strength from the second image processing device 2 so that the radio field strength from the first image processing device 1 becomes lower than that from the second image processing device 2. The adjustment of the radio field strength is not necessarily carried out by lowering the radio field strength from the first image processing device 1. The first image processing device 1 may change the setting of the radio field strength from the second image processing device 2 by increasing it to be higher than the radio field strength from the first image processing device 1. Then the first image processing device 1 is able to have the radio field strength from the first image processing device 1 lower than that from the second image processing device 2. In this case, the first image processing device 1 notifies the second image processing device 2 of the target radio field strength. In response to receiving the target value, the second image processing device 2 increases the radio field strength from the second image processing device 2 to the target value notified by the first image processing device 1. As a result, the radio field strength from the second image processing device 2 becomes higher than that from the first image processing device 1. The radio field strength from the first image processing device 1 becomes relatively lower than that from the second image processing device 2.

The radio field strength from the first image processing device 1 becomes relatively lower than that from the second image processing device 2. In this case, when the portable terminal 4 receives the highest-intensity radio wave and automatically connects to the image processing device, it automatically connects to the second image processing device 2 which emits the higher-intensity radio waves than the first image processing device 1. The portable terminal 4 may send a new job via radio waves. In this case, the new job is sent to the second image processing device 2 to which the less load is applied than the first image processing device 1 rather than the first image processing device 1. As a result, it is not necessary for the user to determine connection to which device, the first image processing device 1 or the second image processing device 2 should be established for sending the job via the portable terminal 4. The portable terminal 4 is allowed to automatically connect to the second image processing device 2 to which the less load is applied and is not busy.

When the first image processing device 1 determines to establish new communication with the portable terminal 4, it adjusts to relatively increase the radio field strength from the first image processing device 1 higher than that from the second image processing device 2, which is opposite from the above-described case. As a way of adjusting the radio field strengths, for example, the first image processing device 1 may increase the radio field strength from the first image processing device 1 higher than the current radio field strength from the second image processing device 2 so that the radio field strength from the first image processing device 1 becomes higher than that from the second image processing device 2. The adjustment of the radio field strengths is not necessarily carried out by increasing the radio field strength from the first image processing device 1. The first image processing device 1 may change the setting of the radio field strength from the second image processing device 2 to cause the radio field strength from the second image processing device 2 to be lower than the radio field strength from the first image processing device 1. Hence, the radio field strength from the first image processing device 1 becomes relatively higher than that from the second image processing device 2. In this case, the first image processing device 1 notifies the second image processing device 2 of the target radio field strength which is the same as the above case. In response to receiving the target value, the second image processing device 2 modifies the radio field strength from the second image processing device 2.

Thus, the radio field strength from the first image processing device 1 relatively increases compared to that from the second image processing device 2. In this case, when the portable terminal 4 receives the highest-intensity radio wave and automatically connects to the image processing device, it automatically connects to the first image processing device 1 which emits the higher-intensity radio waves than the second image processing device 2. The portable terminal 4 may send the new job via radio waves. In this case, the new job is sent to the first image processing device 1 to which the less load is applied than the second image processing device 2 rather than the second image processing device 2. As a result, it is not necessary for the user to determine connection to which device, the first image processing device 1 or the second image processing device 2 should be established for sending the job via the portable terminal 4. The portable terminal 4 is allowed to automatically connect to the first image processing device 1 to which the less load is applied and is not busy.

Figure 2:
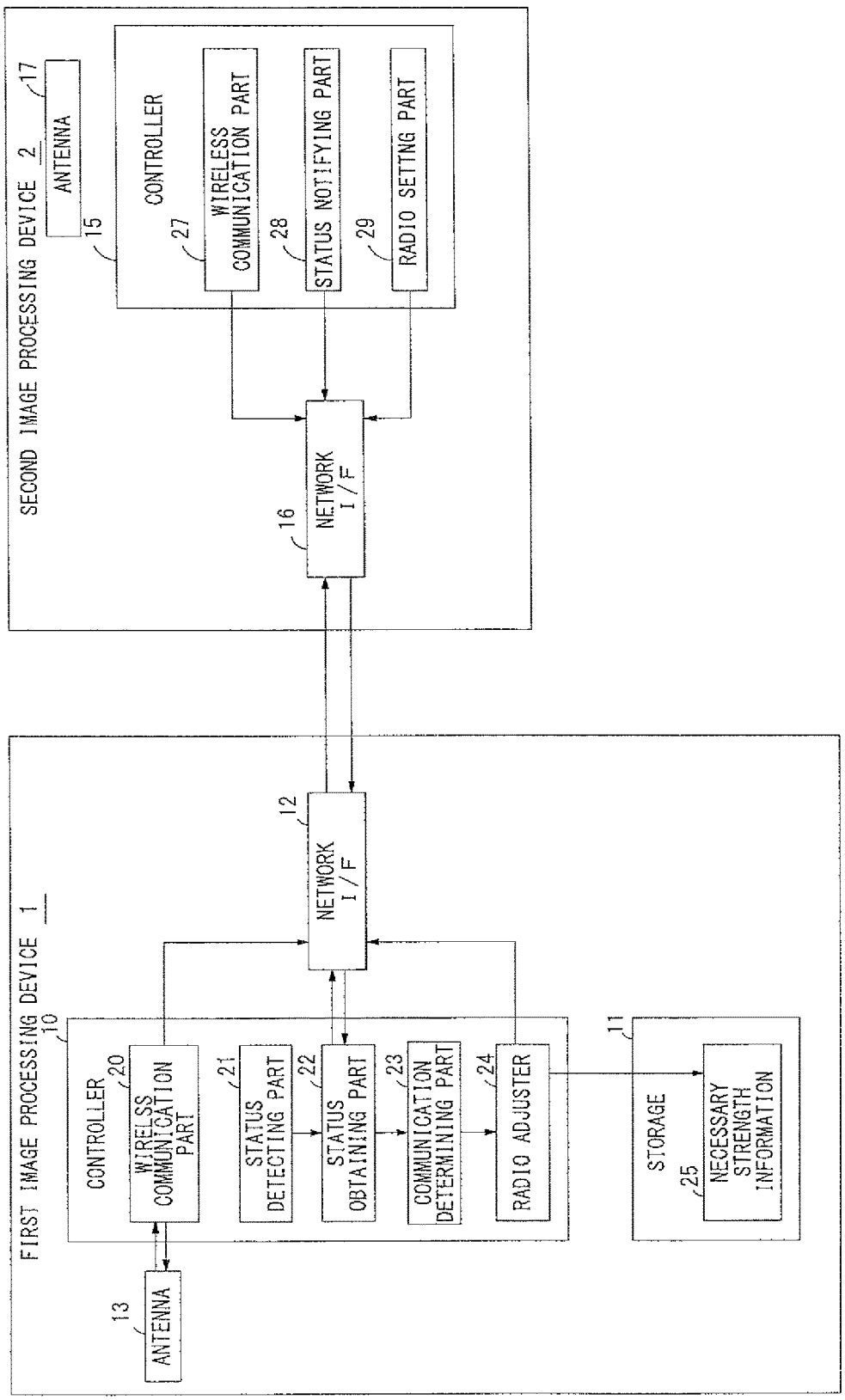
FIG. 2 shows an example of a functional structure of a first image processing device and a second image processing device.

An example of detailed structures of the first and the second image processing devices 1 and 2 are explained next based on FIG. 2. The first image processing device 1 includes a controller 10 with a CPU and a memory, a storage 11, a network interface 12 and an antenna 13. The storage 11 is formed from a device such as a hard disk drive (HDD), and the network interface 12 is to communicate with the second image processing device 2 over the network 3. The antenna 13 is to communicate with the portable terminal 4 via the radio waves. The CPU executes a predetermined program so that the controller 10 serves as a wireless communication part 20, a status detecting part 21, a status obtaining part 22, a communication determining part 23 and a radio adjuster 24.

The second image processing device 2 includes a controller 15 with a CPU and a memory, a network interface 16 and an antenna 17. The network interface 16 is to communicate with the first image processing device 1 over the network 3, and the antenna 17 is to communicate with the portable terminal 4 via the radio waves. The CPU executes a predetermined program so that the controller 15 serves as a wireless communication part 27, a status notifying part 28 and a radio setting part 29.

The first image processing device 1 is described next. The antenna 13 emits around the radio waves of certain frequency and receives the radio waves from the portable terminal 4. The wireless communication part 20 communicates with the portable terminal 4 via the radio waves by driving the antenna 13. The wireless communication part 20 converts the radio waves from the portable terminal 4 received by the antenna 13 into electrical signals (digital data). The wireless communication part 20 drives the antenna 13 based on data sent from the first image processing device 1 to the portable terminal 4 to send the data to the portable terminal 4 via the radio wave emitted from the antenna 13.

The status detecting part 21 detects the change in the load status at the first image processing device 1. The status detecting part 21 monitors the load status at the first image processing device 1 at a regular basis, and when any change is made in the load status at the first image processing device 1, it detects the change. The first image processing device 1 may receive the new job, for example. In this case, the status detecting part 21 is capable of detecting that the load on the first image processing device 1 has been increased in response to receiving the job. Some jobs may not give a significant effect on the load on the first image processing device 1. To be more specific, although there may be an increase in the load on the first image processing device 1, the load may not exceed a predetermined value in response to receiving the job. In such a case, the status detecting part 21 does not detect the increase in the load as the change in the load status. As a result of receiving the new job, the number of the waiting jobs may exceed the predetermined number, or the time required for execution of the new job at the image processing device 1 received after that point of time exceeds the predetermined period of time. In such cases, the status detecting part 21 determines that the change has made in the load status. The status detecting part 21 monitors the number of connection to the portable terminal 4 to which the wireless communication part 20 is connecting via the antenna 13. When the number of connection exceeds the predetermined number, the status detecting part 21 determines that the change has made in the load status and assigns a detecting flag.

When the status detecting part 21 detects that the change has made in the load status on the first image processing device 1, the status obtaining part 22 obtains information relating to the load status at the second image processing device 2. After the detecting flag is assigned by the status detecting part 21, the status obtaining part 22 sends a request for the information relating to the load status at the second image processing device 2 to the second image processing device 2 via the network interface 12. In response to receiving the information relating to the load status at the second image processing device 2 from the second image processing device 2, the status obtaining part 22 obtains the information relating to the load status at the second image processing device 2.

The communication determining part 23 analyzes the information relating to the load status at the second image processing device 2 obtained by the status obtaining part 22, and determines whether or not the first image processing device 1 should establish the new communication with the portable terminal 4. The communication determining part 23 analyzes the information relating to the load status at the second image processing device 2, and determines whether or not the second image processing device 2 is busy. The load status at the second image processing device 2 may meet a predetermined condition such as the number of the waiting jobs is less than the predetermined number. In such a case, the communication determining part 23 determines that the less load is applied to the second image processing device 2 than the first image processing device 1, and determines that the first image processing device 1 should not communicate with the portable terminal 4. The load status at the second image processing device 2 may not meet the predetermined condition as a result of analysis. In this case, it is found that the almost same level of load is applied to the second image processing device 2 as the first image processing device 1. The communication determining part 23 may then determine that the first image processing device 1 communicates with the portable terminal 4. Alternatively, the communication determining part 23 may compare the load statuses at the first image processing device 1 with that at the second image processing device 2, thereby determining the image processing device to which less load is applied communicates with the portable terminal 4.

The radio adjuster 24 adjusts the radio field strengths from the antenna 13 of the first image processing device 1 and from the antenna 17 of the second image processing device 2. It is assumed, for example, that the communication determining part 23 determines that the first image processing device 1 does not communicate with the portable terminal 4. In this case, the radio adjuster 24 adjusts to relatively lower the radio field strength from the first image processing device 1 below that from the second image processing device 2. It is assumed that the communication determining part 23 determines that the first image processing device 1 communicates with the portable terminal 4. In this case, the radio adjuster 24 adjusts to relatively increase the radio field strength from the first image processing device 1 higher than that from the second image processing device 2.

As described above, the status obtaining part 22 has already obtained the current radio field strength from the second image processing device 2 by sending the request to the second image processing device 2. For relatively lowering the radio field strength from the first image processing device 1 below that from the second image processing device 2 based on the determination at the communication determining part 23, the radio adjuster 24 configures the value of the radio field strength from the first image processing device 1 relatively lower than the current radio field strength from the second image processing device 2. Thus, the radio field strength from the first image processing device 1 may be lowered than that from the second image processing device 2. If the radio field strength emitted from the antenna 13 of the first image processing device 1, for instance, is allowed to be lowered, the radio adjuster 24 lowers the radio field strength emitted from the antenna 13 of the first image processing device 1 than the radio field strength emitted from the antenna 17 of the second image processing device 2 so that the radio field strength from the first image processing device 1 may be lowered than the current radio field strength from the second image processing device 2. After determining the target value of the radio field strength from the first image processing device 1, the radio adjuster 24 notifies the wireless communication part 20 of the determined value, and modifies to lower the radio field strength emitted from the antenna 13 via the wireless communication part 20. As a result, the radio adjuster 24 is allowed to adjust for the second image processing device 2 to establish new communication with the portable terminal 4. The radio field strength from the first image processing device 1 is modified as described above, so that the radio field strength from the first image processing device 1 is lowered. If the radio field strength from the first image processing device 1 may be relatively lowered than that from the second image processing device 2, it is not necessary to modify the value of the radio field strength from the second image processing device 2, resulting in efficient processing.

Sometimes the radio field strength from the first image processing device 1 cannot be lowered. In such cases, if the radio field strength from the second image processing device 2 may be modified, the radio adjuster 24 may adjust to relatively increase the radio field strength from the second image processing device 2. The radio adjuster 24 determines the target value so that the radio field strength from the second image processing device 2 becomes relatively higher than that from the first image processing device 1. The radio adjuster 24 then notifies the second image processing device 2 of the determined target value of the radio field strength. The second image processing device 2 modifies the radio field strength emitted from the antenna 17 of the second image processing device 2 based on the notification from the first image processing device 1.

It is assumed that, for example, when the change in the load status at the first image processing device 1 is detected by the status detecting part 21, the first image processing device 1 has already started the communication with the portable terminal 4. In this case, the radio adjuster 24 needs to keep the radio field strength which allows maintenance of the connection until the connection is terminated. In such a case, the radio adjuster 24 may adjust to increase the radio field strength from the second image processing device 2 relatively higher than that from the first image processing device 1. If the radio field strength emitted from the antenna 13 of the first image processing device 1 is lowered when the first image processing device 1 has already started the communication with the portable terminal 4, the connection with the portable terminal 4 may be terminated. In order to prevent the termination of the connection, the radio adjuster 24 keeps the radio field strength from the first image processing device 1, thereby maintaining the connection with the portable terminal 4. Also, by increasing the radio field strength from the second image processing device 2, the radio adjuster 24 is allowed to relatively lower the radio field strength from the first image processing device 1.

Necessary strength information 25 is stored in advance in the storage 11. The necessary strength information 25 relates to the radio field strength from the first image processing device 1 which is required for maintenance of the communication already started with the portable terminal 4, for instance. The radio adjuster 24 may adjust the radio field strength to avoid the radio field strength from the first image processing device 1 from being below the necessary radio field strength required for maintenance of the communication with the portable terminal 4 by referring the necessary strength information 25. FIG. 3 shows an example of the necessary strength information 25. The necessary strength information 25 includes receiving strength 25a and emitting strength 25b associated with each other. The level of the radio field strength received from the portable terminal 4 by the antenna 13 is recorded as the receiving strength 25a. The level of the radio field strength which is required to be emitted from the antenna 13 of the first image processing device 1 corresponding to the receiving strength 25a is recorded as the emitting strength 25b. By referring the example of FIG. 3, the portable terminal 4 and the first image processing device 1 are communicating with each other via radio waves, for example, and the receiving strength 25a that the first image processing device 1 is receiving from the portable terminal 4 is "3." In this case, the radio field strength which is required to be emitted from the antenna 13 of the first image processing device 1 to the portable terminal 4 in order to maintain the communication with the portable terminal 4 is "5." After the radio adjuster 24 confirms that the radio field strength received from the portable terminal 4 is "3," it confirms the radio field strength which is required to be emitted from the first image processing device 1 is "5" based on the emitting strength 25b corresponding to the receiving strength 25a by referring the necessary strength information 25. For adjusting to relatively lower the radio field strength from the first image processing device 1, for example, the radio adjuster 24 keeps the radio field strength emitted from the antenna 13 of the first image processing device 1 not to be under "5," and adjusts the radio field strength from the second image processing device 2 to become higher than the radio field strength from the first image processing device 1. The first image processing device 1 is allowed to maintain the communication currently established with the portable terminal 4. At the same time, when another portable terminal 4 is willing to establish new communication with the image processing device for execution of the job, the first image processing device 1 is allowed to adjust the radio field strength to cause the another portable terminal 4 to automatically connect to the second image processing device 2.

Moreover, the radio adjuster 24 may adjust both the radio field strength emitted from the antenna 13 of the first image processing device 1 and the radio field strength emitted from the antenna 17 of the second image processing device 2, for example. Thus, the radio adjuster 24 is allowed to adjust the radio field strength from the first image processing device 1 to become relatively lower than the radio field strength from the second image processing device 2.

It is assumed that the communication determining part 23 determines that the first image processing device 1 should establish new communication with the portable terminal 4. In this case, the radio adjuster 24 adjusts the radio field strength from the first image processing device 1 to become relatively higher than the radio field strength from the second image processing device 2. As a detailed way of adjustment, the radio adjuster 24 may configure the value of the radio field strength from the first image processing device 1 that is higher than the current radio field strength from the second image processing device 2. Alternatively, the radio adjuster 24 may determine the value of the radio field strength from the second image processing device 2 that is lower than the radio field strength from the first image processing device 1, and notify the second image processing device 2 of the determined value.

It is assumed that the communication determining part 23 determines that either of the image processing devices should establish new communication with the portable terminal 4 after comparing the load statuses at the first and the second image processing device 1 and 2. In this case, the radio adjuster 24 adjusts the radio field strength from either of the first and the second image processing devices 1 and 2 to become relatively higher than the radio field strength from another image processing device 1 or 2. Thus, the radio field strength from either the first image processing device 1 or the second image processing device 2 to which less load is applied is configured higher than another image processing device 1 or 2. The portable terminal 4 automatically connects to the image processing device which emits the higher-intensity radio waves so that the job is executed smoothly.

The second image processing device 2 is described next. The antenna 17 emits around the radio waves of certain frequency and receives the radio waves from the portable terminal 4, for instance. As described above, the controller 15 serves as the wireless communication part 27, the status notifying part 28 and the radio setting part 29. The wireless communication part 27, the same as the wireless communication part 20 of the first image processing device 1, communicates with the portable terminal 4 via radio waves by driving the antenna 17.

The status notifying part 28 notifies the first image processing device 1 of the information relating to the load status at the second image processing device 2 in response to the request from the status obtaining part 22 of the first image processing device 1. After receiving the request from the status obtaining part 22 over the network 3, the status notifying part 28 confirms the load status at the second image processing device 2 and generates the load status information. The status notifying part 28 generates the load status information by checking the number of the waiting jobs or the number of connecting portable terminal 4, or calculating the waiting time from receipt of the new job to its execution, for example. The status notifying part 28 then sends the generate load status information to the first image processing device 1 over the network 3. After receiving the load status information from the status notifying part 28, the first image processing device 1 is allowed to determine which image processing device communicates with the portable terminal 4, and adjust the radio field strength depending on the determination.

The radio setting part 29 configures the radio field strength from the second image processing device 2 based on the notification received from the radio adjuster 24 of the first image processing device 1. When the radio adjuster 24 determines to modify the current value of the radio field strength from the second image processing device 2 based on the determination at the communication determining part 23, it notifies the second image processing device 2 of the target value of the radio field strength. In response to receiving the notification, the radio setting part 29 confirms the notified target value of the radio field strength, and modifies the current radio field strength emitted from the antenna 17 of the second image processing device 2 to the notified target value. The antenna 17 emits around the radio waves of the modified frequency, and the portable terminal 4 placed around the second image processing device 2 receives the radio waves.

Figure 4:
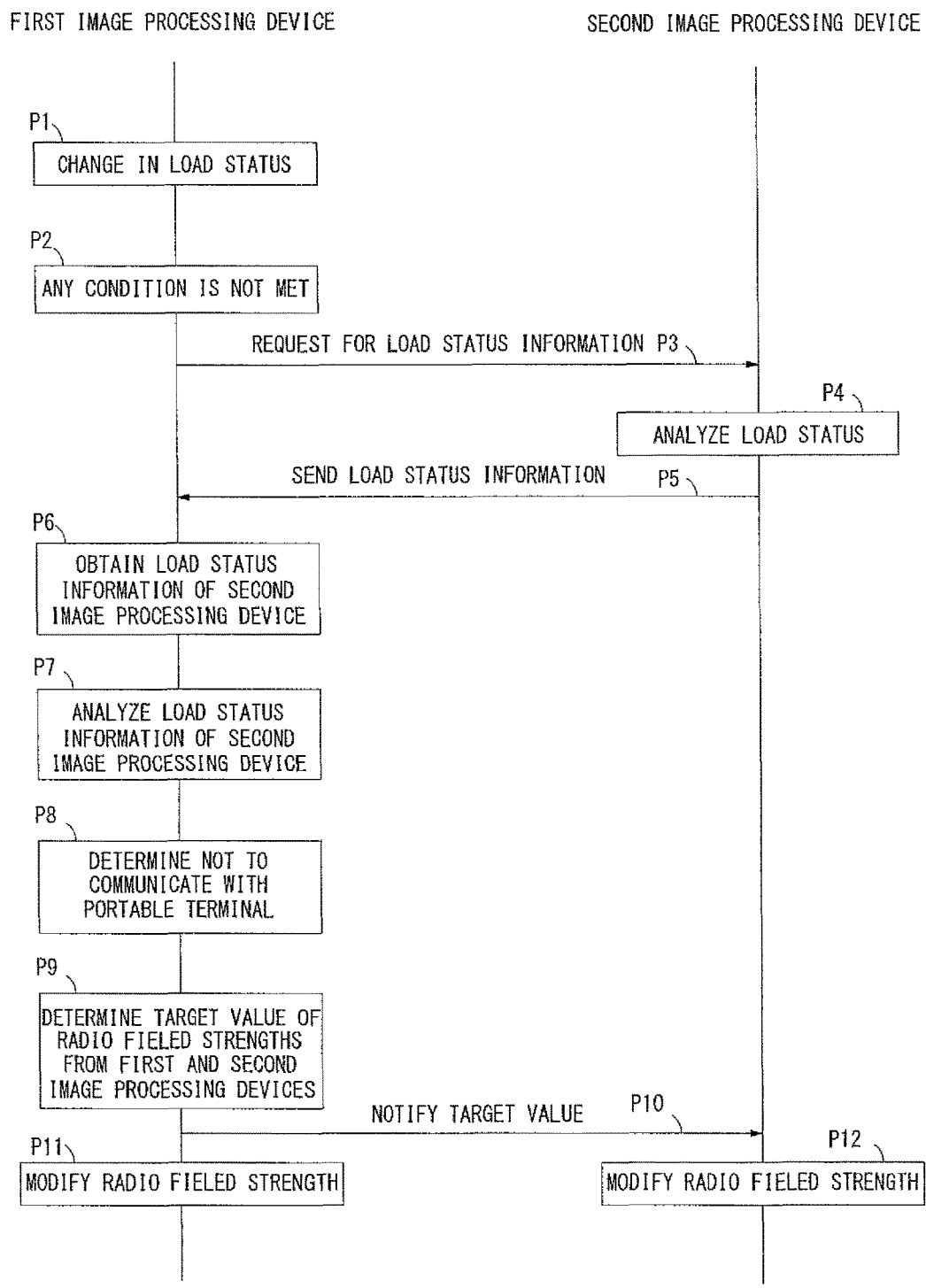
FIG. 4 is a flow diagram explaining an exemplary sequential procedure performed when the first image processing device obtains load status information from the second image processing device by detecting a change in a load status and modifies radio field strengths from the first and the second image processing devices.

FIG. 4 is a flow diagram explaining an exemplary sequential procedure performed when the first image processing device 1 obtains the load status information from the second image processing device 2 by detecting the change in the load status and modifies the radio field strengths from the first and the second image processing devices 1 and 2. It is assumed, for example, the first image processing device 1 receives the job, and the change is made in the load status at the first image processing device 1 (process P1). In this case, the first image processing device 1 determines if the first image processing device 1 is busy. The first image processing device 1 makes the aforementioned determination by determining if at least one of the conditions which define the current load status is not busy is met. The conditions are such as whether or not the number of the waiting job is less than the predetermined number. When any of the conditions which define the current load status is not busy is not met (process P2), the first image processing device 1 sends the request for the load status information to the second image processing device 2 (process P3). After receiving the request, the second image processing device 2 analyzes its load status (process P4), and generates the load status information. The second image processing device 2 then sends the generated load status information to the first image processing device 1 (process P5). In response to obtaining the load status information of the second image processing device 2 (process P6), the first image processing device 1 analyzes the obtained load status information (process P7). As a detailed way of analysis, the first image processing device 1 determines whether or not the load status information of the second image processing device 2 meets at least one of the predetermined conditions. When at least one of the predetermined conditions is met, the first image processing device 1 determines that the second image processing device 2 is not busier than the first image processing device 1. Alternatively, the first image processing device 1 determines which image processing device has the less load by comparing the load statuses at the first and the second image processing devices 1 and 2.

As a result of the analysis, the first image processing device 1 may determine that it should not establish new communication with the portable terminal 4 (process P8). In this case, the first image processing device 1 adjusts to relatively lower the radio field strength from the first image processing device 1 below that from the second image processing device 2. As a way of adjusting the radio field strengths, the first image processing device 1 may configure the radio field strength from the first image processing device 1 lower than the current radio field strength from the second image processing device 2 or configure the radio field strength from the second image processing device 2 higher than the current radio field strength from the first image processing device 1. Alternatively, the first image processing device 1 modifies both the current radio field strengths from the first and the second image processing devices 1 and 2, and adjusts to make the radio field strength from the second image processing device 2 higher than the radio field strength from the first image processing device 1. A radio field strength adjustment to adjust the radio field strengths is described in detail later. In the example of FIG. 4, the first image processing device 1 determines the target values of the respective radio field strengths from the first and the second image processing devices 1 and 2 which are modified from the current values (process P9). The first image processing device 1 then notifies the determined target value to the second image processing device 2 (process P10), and modifies its current radio field strength to the determined value (process P11). The second image processing device 2 thereby notified modifies its radio field strength to the value determined at the first image processing device 1 (process P12), and completes the process.

Figure 5:
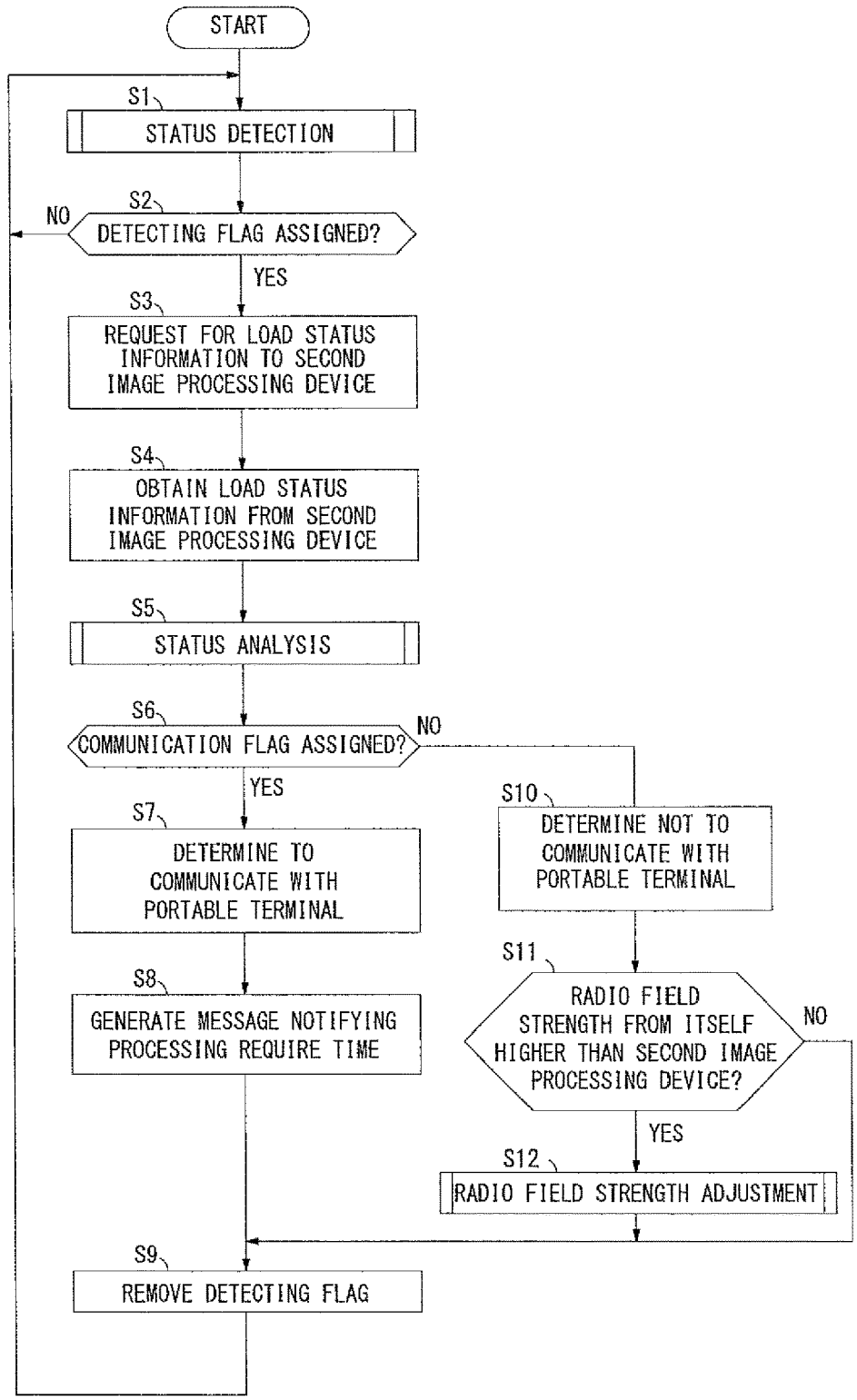
FIG. 5 is a flowchart showing an example of the procedure performed at the first image processing device of the first embodiment.

An example of a particular procedure performed at the first image processing device 1 is described next. FIG. 5 is a flowchart showing an example of the procedure performed at the first image processing device 1 after it detects the change in its load status until adjusting the radio field strength from the first image processing device 1 or the second image processing device 2. Upon starting the process, the first image processing device 1 performs a status detection to detect the change in its load status (step S1), and assigns the detecting flag in response to detecting the change. The detail of the status detection is explained later. The first image processing device 1 determines if the detecting flag is assigned (step S2). When detecting that the detecting flag is not assigned (when a result of step S2 is NO), the first image processing device 1 returns to the status detection (step S1) and repeats the process until it detects the detecting flag is assigned. When detecting that the detecting flag is assigned (when a result of step S2 is YES), the first image processing device 1 sends the request for the load status information to the second image processing device 2 (step S3).

After obtaining the load status information from the second image processing device 2 (step S4), the first image processing device 1 performs the status analysis to analyze the obtained load status information (step S5). The first image processing device 1 may determine that the second image processing device 2 is busy as a result of the status analysis. In this case, the first image processing device 1 assigns a communication flag. The detail of the status analysis is explained later. The first image processing device 1 then determines if the communication flag is assigned (step S6). When determining that the communication flag is assigned (when a result of step S6 is YES), the first image processing device 1 determines that it establishes communication with the portable terminal 4 (step S7). The first image processing device 1 generates a message notifying the portable terminal 4 that it takes time for job processing (process P8). The first image processing device 1 then removes the detecting flag (process P9), and returns to the status detection (step S1) to repeat the above-described process. The first image processing device 1 may determine it is busy through the status detection (step S1) and the second image processing device 2 is also busy through the status analysis (step S5). In this case, it is not much needed for causing the portable terminal 4 to connect to the second image processing device 2. Therefore, the first image processing device 1 determines it establishes communication with the portable terminal 4 and generates the message notifying it takes time for job execution. The first image processing device 1 then notifies the portable terminal 4 with which it establishes communication of the generated message. Thus, the portable terminal 4 which connects to the first image processing device 1 is allowed to display the message, and the user is allowed to know it takes time for job execution.

When determining that the communication flag is not assigned in step S6 (when a result of step S6 is NO), the first image processing device 1 determines that it does not establish communication with the portable terminal 4 (step S10). To be more specific, it is determined in the status analysis (step S5) that the second image processing device 2 is not busy so that the communication flag is not assigned. The first image processing device 1 determines that it does not establish communication with the portable terminal 4, and the portable terminal 4 may be connected to the second image processing device 2 which is not busy. As a result, the job may be executed smoothly.

The first image processing device 1 determines whether or not the radio field strength from the first image processing device 1 is higher than that from the second image processing device 2 (step S11). When determining the radio field strength from the first image processing device 1 is higher than that from the second image processing device 2 (when a result of step S11 is YES), the first image processing device 1 performs a radio field strength adjustment (step S12) to adjust to relatively lower the radio field strength from the first image processing device 1 below that from the second image processing device 2. The detail of the radio field strength adjustment is explained later. When determining the radio field strength from the first image processing device 1 is not higher than that from the second image processing device 2 (when a result of step S11 is NO), the portable terminal 4 automatically connects to the second image processing device 2 of the first and the second image processing devices 1 and 2. In this case, the first image processing device 1 skips the radio field strength adjustment and removes the detecting flag (step S9). The first image processing device 1 then returns to the status detection (step S1).

Figure 6:
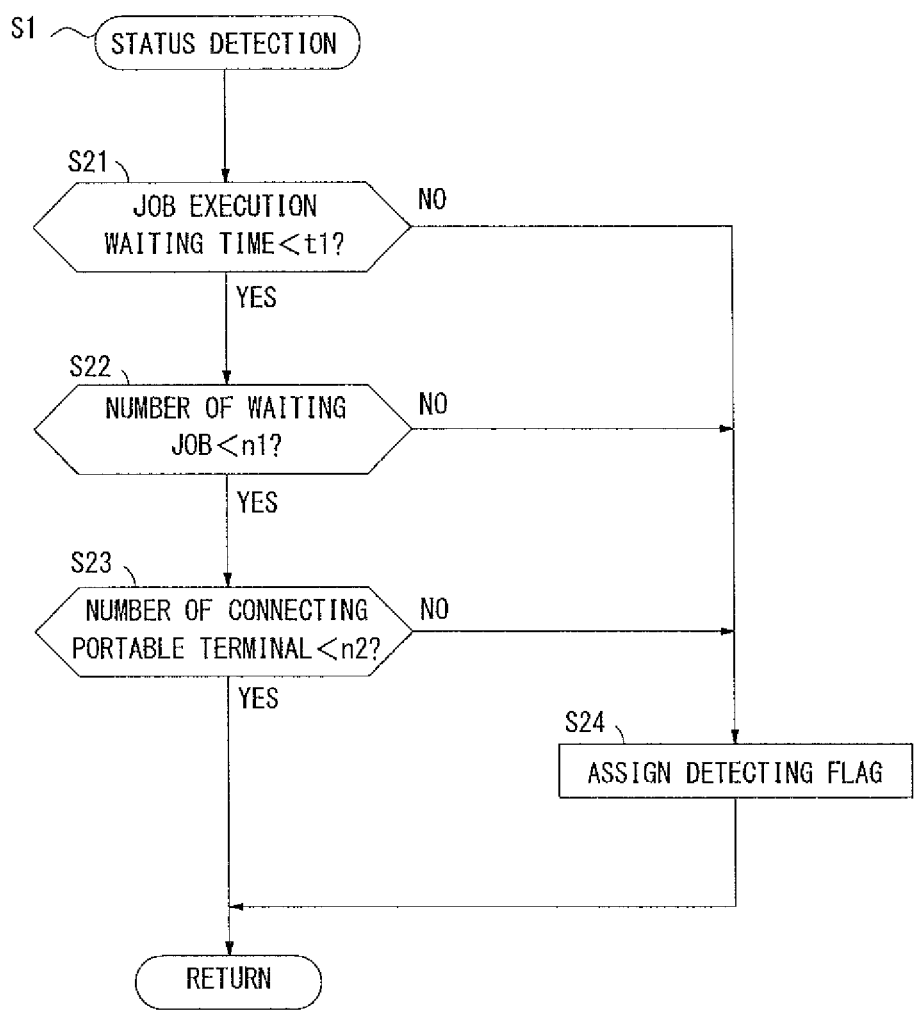
FIG. 6 is a flowchart explaining the detailed exemplary sequential procedure of a status detection of the first embodiment.

FIG. 6 is a flowchart explaining the detailed exemplary sequential procedure of the status detection (step S1 of FIG. 5). In order to detect its load status, the first image processing device 1 determines if the time (execution waiting time) takes from receipt of the new job to execution of it is shorter than a predetermined time (t1) (step S21). The execution waiting time is obtained by making a rough estimate of a time required for each job currently waiting at the first image processing device 1 and adding up each estimated time. If the first image processing device 1 determines that the job execution waiting time is shorter than the predetermined time (t1) (when a result of step S21 is YES), it determines whether or not the number of the waiting job is less than a predetermined number (n1) (step S22). If the first image processing device 1 determines that the number of the waiting job is less than the predetermined number (n1) (when a result of step S22 is YES), it determines whether or not the number of the portable terminal 4 to which it currently connecting is less than a predetermined number (n2) (step S23). When the first image processing device 1 determines that the number of the portable terminal 4 to which it currently connecting is less than the predetermined number (n2) (when a result of step S23 is YES), it completes the status detection. On the other hand, when it determines that any of the conditions of steps S21, S22 and S23 is not met (when a result of step S21, S22 or S23 is NO), the first image processing device 1 assigns the detecting flag (step S24), and completes the status detection. The first image processing device 1 is allowed to determine whether or not it is busy through the status detection. When it is busy (when any conditions of steps S21, S22 and S23 is not met), the first image processing device 1 assigns the detecting flag. The first image processing device 1 then obtains the load status information of the second image processing device 2 in later process, and determines whether or not it should communicate with the portable terminal 4.

Figure 7:
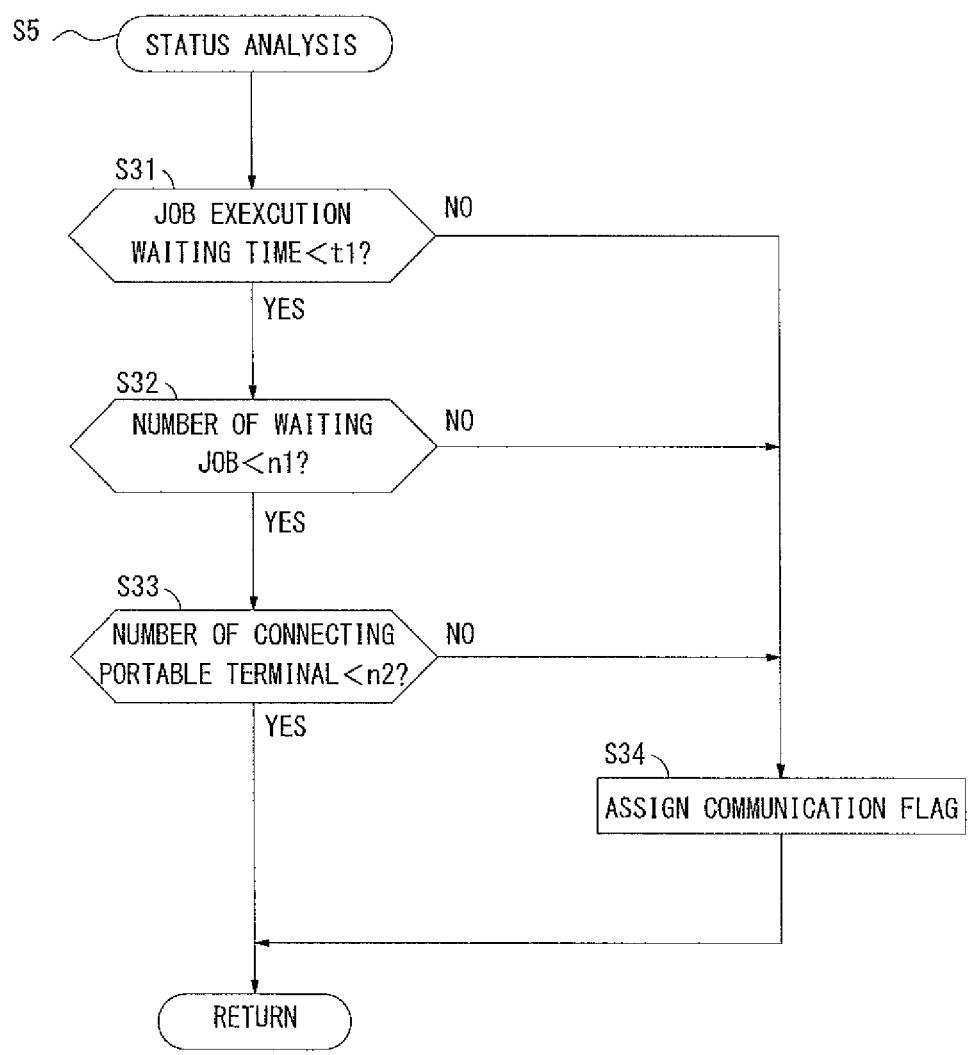
FIG. 7 is a flowchart explaining the detailed exemplary sequential procedure of a status analysis of the first embodiment.

FIG. 7 is a flowchart explaining the detailed exemplary sequential procedure of the status analysis (step S5 of FIG. 5). After obtaining the load status information of the second image processing device 2 (step S4 of FIG. 5), the first image processing device 1 determines if the time (execution waiting time) takes from receipt of the new job to execution of it at the second image processing device 2 is shorter than the predetermined time (t1) (step S31). If the first image processing device 1 determines that the job execution waiting time is shorter than the predetermined time (t1) (when a result of step S31 is YES), it determines whether or not the number of the waiting job at the second image processing device 2 is less than the predetermined number (n1) (step S32). If the first image processing device 1 determines that the number of the waiting job is less than the predetermined number (n1) (when a result of step S32 is YES), it determines whether or not the number of the portable terminal 4 to which the second image processing device 2 is currently connecting is less than the predetermined number (n2) (step S33). When the first image processing device 1 determines that the number of the portable terminal 4 to which the second image processing device 2 is currently connecting is less than the predetermined number (n2) (when a result of step S33 is YES), it completes the status analysis. On the other hand, when it determines that any of the conditions of steps S31, S32 and S33 is not met (when a result of step S31, S32 or S33 is NO), the first image processing device 1 assigns the communication flag, and completes the status analysis. When the load status at the second image processing device 2 meets all of the conditions in steps S31, S32 and S33, it is considered the second image processing device 2 is not busy. When it is considered the second image processing device 2 is not busy, the first image processing device 1 determines it does not establish new communication with the portable terminal 4 without assigning the communication flag (step S10 of FIG. 5). As a result, the portable terminal 4 may automatically connect to the second image processing device 2 to which the less load is applied than the first image processing device 1 for execution of the new job. When the load status at the second image processing device 2 does not meet any of the conditions in steps S31, S32 and S33, it is considered the second image processing device 2 is busy. In this case, there is less need for the image processing device 1 to not communicating with the portable terminal 4. The image processing device 1 assigns the communication flag, and determines it establishes new communication with the portable terminal 4 (step S7 of FIG. 5).

Figure 8:
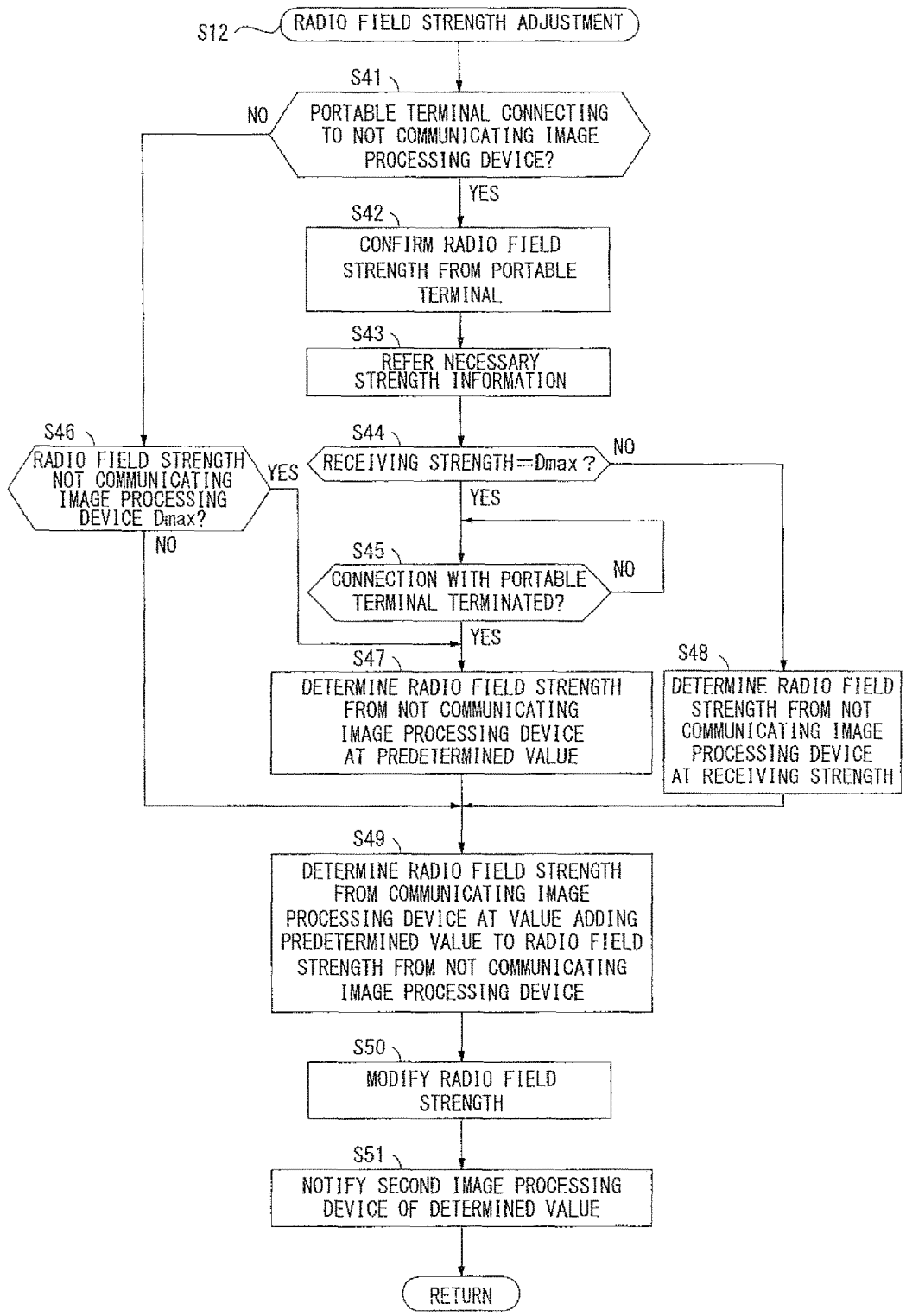
FIG. 8 is a flowchart explaining the detailed exemplary sequential procedure of a radio field strength adjustment of the first embodiment.

FIG. 8 is a flowchart explaining the detailed exemplary sequential procedure of the radio field strength adjustment (step S12 of FIG. 5). The image processing device 1 determines whether or not any portable terminal 4 is currently connecting to the image processing device which does not establish communication (step S41). In this case, the first image processing device 1 is the image processing device which does not establish the new communication with the portable terminal 4. When determining that the portable terminal 4 is connecting to the first image processing device 1 (when a result of step S41 is YES), the first image processing device 1 confirms the radio field strength received from the portable terminal 4. To be more specific, the first image processing device 1 confirms the receiving strength 25a (step S42). The first image processing device 1 refers the necessary strength information 25 stored in the storage 11 (step S43) to confirm the emitting strength 25b emitted from the first image processing device 1 to maintain the communication. The first image processing device 1 determines if the confirmed emitting strength is the same value as a maximum emitting strength (Dmax) of the radio field strength (step S44). The emitting strength may be the same value as the Dmax (when a result of step S44 is YES). In this case, the radio field strength from the first image processing device 1 cannot be decreased from the current value as the connection with the portable terminal 4 is established. The first image processing device 1 then determines if the execution of the job is complete and the connection with the portable terminal 4 is terminated (step S45). When it is determined that the connection with the portable terminal 4 is terminated (when a result of step S45 is YES), the first image processing device 1 determines a predetermined value which is not the Dmax as the radio field strength from the first image processing device 1 which is determined not to establish the communication with the portable terminal 4 (step S47). When it is determined that the connection with the portable terminal 4 is not terminated (when a result of step S45 is NO), the first image processing device 1 is put into a standby state until the connection is terminated. As the first image processing device 1 is in the standby state until the connection is terminated in step S45, it modifies the radio field strength from the second image processing device 2 at the maximum emitting strength, which is not described in the first embodiment. As a result, new connection from another portable terminal 4 may be established with not only the first image processing device 1 but also the second image processing device 2 for executing the new job before termination of the connection. Hence, the concentration of the connection with the portable terminal 4 at the first image processing device 1 may be prevented.

When determining that the portable terminal 4 is not connecting to the first image processing device 1 (when a result of step S41 is NO), the first image processing device 1 determines if the radio field strength from it is Dmax (step S46). If the radio field strength from it is Dmax (when a result of step S46 is YES), the first image processing device 1 determines the radio field strength from it at the predetermined value which is not Dmax (step S47). The emitting strength 25b may not be the same value as the Dmax (when a result of step S44 is NO). In this case, the first image processing device 1 determines the radio field strength from it at the same value as the emitting strength 25h (step S48).

The first image processing device 1 determines the radio field strength from it through the process in steps S41 to S48. After that, the first image processing device 1 determines the target value of the radio field strength from the second image processing device 2 at the value which is obtained by adding the predetermined value to the radio field strength from the first image processing device 1 (step S49). The first image processing device 1 then modifies the radio field strength from it at the determined value (step S50), and notifies the second image processing device 2 of the determined target value (step S51). The first image processing device 1 completes the process. Thus, the radio field strength from the first image processing device 1 is adjusted to be relatively lower than radio field strength from the second image processing device 2. When the portable terminal 4 executes the new job, it does not connect to the first image processing device 1 which is busy. The execution of the job may be carried out smoothly. According to the sequential procedure of FIG. 8, the second image processing device 2 is notified the target value of the radio field strength from the second image processing device 2 thereby determined (step S51). The target value of the radio field strength from the second image processing device 2 thereby determined may be the same value as the current radio field strength from the second image processing device 2 which has already been sent from the second image processing device 2 in response to the request from the first image processing device 1. In such a case, no modification is made in the radio field strength from the second image processing device 2. Hence, it is not necessary for the first image processing device 1 to notify the second image processing device 2 of the determined target value of the radio field strength.

It is assumed that the load applied to the first image processing device 1 is increased and the load status at the first image processing device 1 meets the predetermined condition, for example. In this case, the radio field strengths from the first and the second image processing devices 1 and 2 are adjusted as described above. When the load applied to the first image processing device 1 is increased and the load status at the first image processing device 1 meets the predetermined condition, the adjustment is carried out to relatively lower the radio field strength from the first image processing device 1 below the radio field strength from the second image processing device 2 as described above. After the adjustment, the first image processing device 1 monitors its load status at a regular basis, and the load applied to the first image processing device 1 may be reduced and the load status at the first image processing device 1 may not meet the predetermined condition. In this case, the adjustment of the radio field strengths from the first and the second image processing devices 1 and 2 is again carried out to relatively increase the radio field strength from the first image processing device 1 higher than the radio field strength from the second image processing device 2.

The first image processing device 1 may carry out the adjustment of the radio field strengths from the first and the second image processing devices 1 and 2 not only when the load applied to the first image processing device 1 is increased and the load status at the first image processing device 1 meets the predetermined condition (first condition) but also the load applied to the first image processing device 1 is reduced and the load status at the first image processing device 1 meets the predetermined condition (second condition). To be more specific, even when the heavy load is not applied to the first image processing device 1, the heavy load may be applied to the second image processing device 2. In such a case, the first image processing device 1 waits until the load applied to the first image processing device 1 is reduced and the load status at the first image processing device 1 meets the predetermined condition (second condition). The first image processing device 1 then carries out the adjustment of the radio field strengths from the first and the second image processing devices 1 and 2. As a result, the radio field strength from the first image processing device 1 may be relatively increased higher than the radio field strength from the second image processing device 2. This may be prevent the second image processing device 2 from being applied heavier load.

As described above, after the first image processing device detects the change in its load status, it obtains the information relating to the load status at the second image processing device and analyzes the obtained information. When the first image processing device determines not to establish communication with the portable terminal, it lowers the strength of the radio waves emitted from the first image processing device below the strength of the radio waves emitted from the second image processing device in a relative manner. As a result, the communication with the image processing device which is not busy may be establish without any instruction by the user, resulting in efficient image processing.

Second Embodiment

A second embodiment is described next. In the aforementioned description of the first embodiment, the first image processing device 1 determines it establishes new communication with the portable terminal 4 when the load status at the second image processing device 2 does not meet any of the predetermined conditions in the status analysis (step S5 of FIG. 5) to analyze the load status information of the second image processing device 2. According to the second embodiment, the load statuses at the respective devices, the first image processing device 1 and the second image processing device 2, are compared. Determination to determine which device has less workload is made based on a predetermined priority condition, and either the first image processing device 1 or the second image processing device 2 thereby determined establishes new communication with the portable terminal 4.

Figure 9:
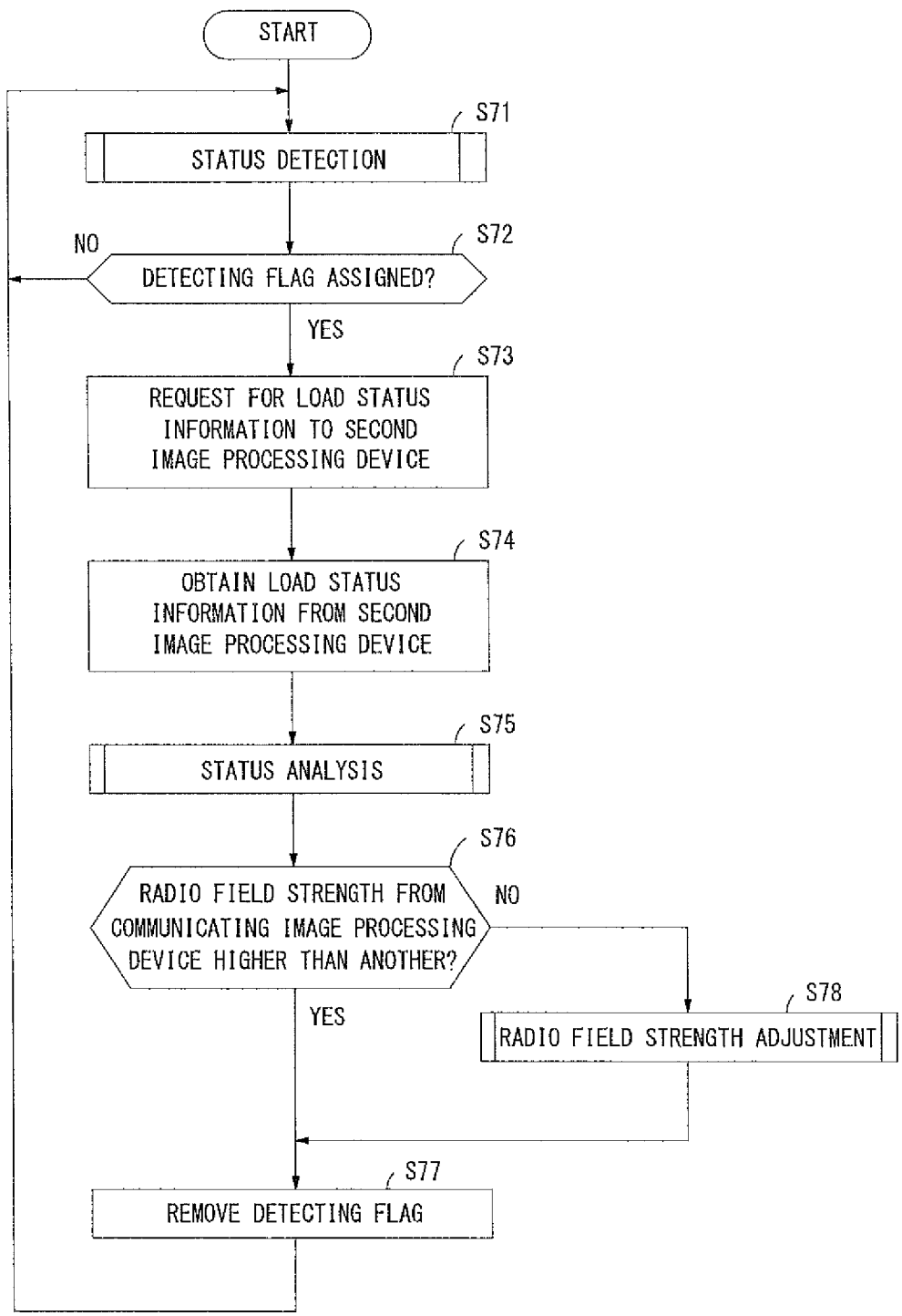
FIG. 9 is a flowchart showing an example of the procedure performed at the first image processing device of a second embodiment.

FIG. 9 is a flowchart showing an example of the procedure performed at the first image processing device 1 of the second embodiment. The process in steps S71 to S74 of FIG. 9 is the same as that in steps S1 to S4 of FIG. 5 of the first embodiment. After obtaining the load status information from the second image processing device 2, the first image processing device 1 performs the status analysis (step S75) to determine the image processing device which establishes new communication with the portable terminal 4. The status analysis (step S75) is described in detail later. The first image processing device 1 then determines whether or not the radio field strength from the image processing device which is determined to establish new communication is higher than the radio field strength from another image processing device (step S76). The radio field strength from the image processing device which is determined to establish new communication may be higher than the radio field strength from another image processing device as a result of the determination (when a result of step S76 is YES). In this case, the first image processing device 1 removes the detecting flag, and returns to the first process, the status detection (step S71). The radio field strength from the image processing device which is determined to establish new communication may be lower than the radio field strength from another image processing device (when a result of step S76 is NO). In this case, the first image processing device 1 performs a radio field strength adjustment (step S78). The process sequential procedure of the radio field strength adjustment is the same as the radio field strength adjustment in the first embodiment (flowchart of FIG. 8). After the radio field strength adjustment, the first image processing device 1 removes the detecting flag, and returns to the first process, the status detection (step S71).

Figure 10:
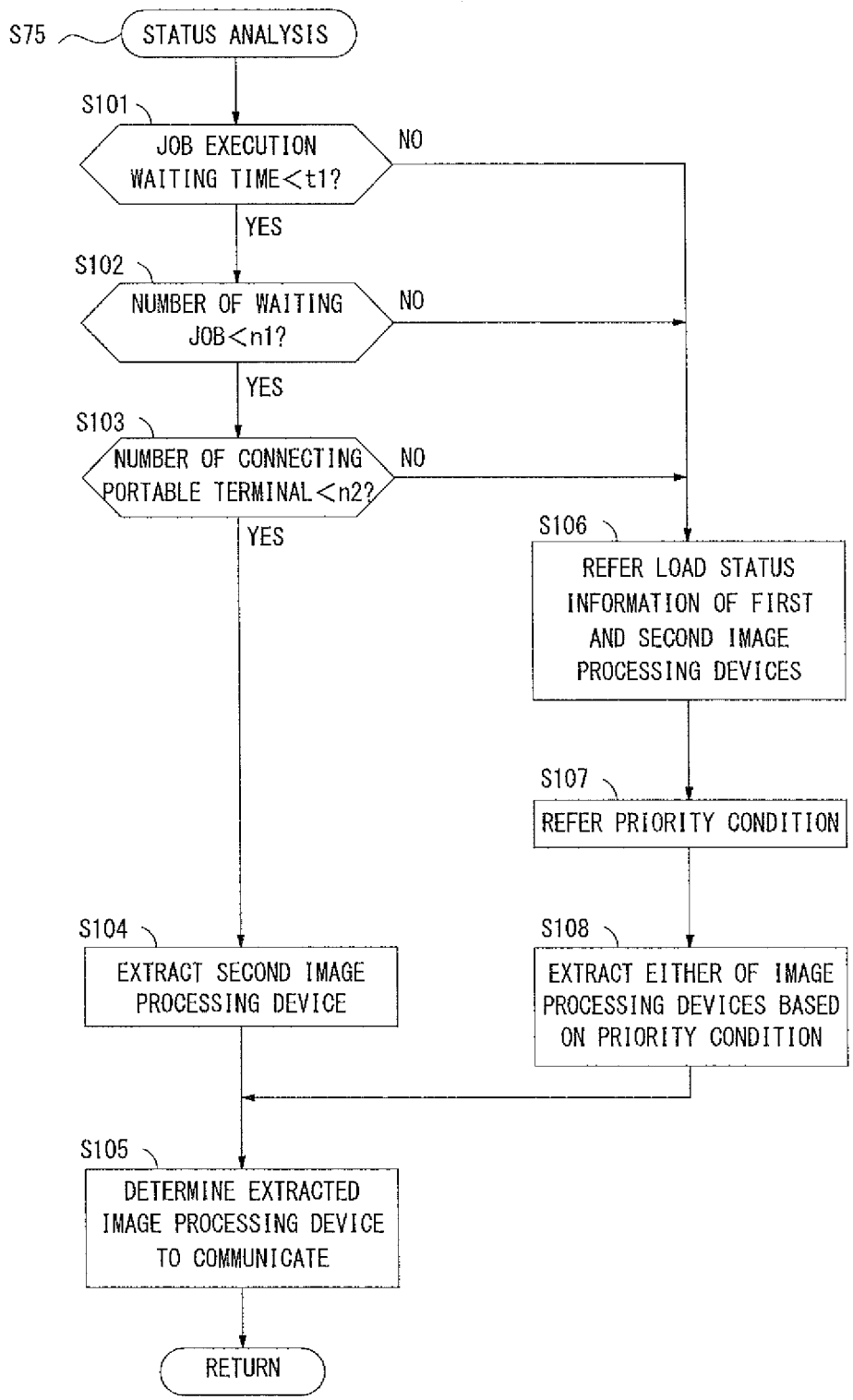
FIG. 10 is a flowchart explaining the detailed exemplary sequential procedure of the status analysis of the second embodiment.

FIG. 10 is a flowchart explaining the detailed exemplary sequential procedure of the status analysis of the second embodiment (step S75 of FIG. 9). The first image processing device 1 analyzes the obtained load status information of the second image processing device 2, and determines if the execution waiting time for the new job is shorter than the predetermined time (t1) (step S101). If the first image processing device 1 determines that the job execution waiting time is shorter than the predetermined time (t1) (when a result of step S101 is YES), it determines whether or not the number of the waiting job at the second image processing device 2 is less than the predetermined number (n1) (step S102). If the first image processing device 1 determines that the number of the waiting job is less than the predetermined number (n1) (when a result of step S102 is YES), it determines whether or not the number of the portable terminal 4 to which the second image processing device 2 is currently connecting is less than the predetermined number (n2) (step S103). When the first image processing device 1 determines that the number of the portable terminal 4 to which the second image processing device 2 is currently connecting is less than the predetermined number (n2) (when a result of step S103 is YES), it extracts the second image processing device 2 (step S104) to determine as the image processing device which establishes new communication (step S105). To be more specific, when all the conditions in steps S101 to S103 are met (when the results of steps S101 to S103 are YES), it is considered the second image processing device 2 is not busy compared to the first image processing device 1. Thus, the first image processing device 1 determines the second image processing device 2 as the image processing device which establishes new communication with the portable terminal 4.

When any of the conditions in steps S101 to S103 is not met (when any of the results of steps S101 to S103 is NO), the first image processing device 1 refers the load status information of the respective first and second image processing devices 1 and 2 (step S106). The first image processing device 1 then refers a priority condition table 50 which is stored in the storage 11, for instance (step S107) to extract either of the image processing devices based on predetermined priority conditions of the priority condition table 50 (step S108). FIG. 11 shows an example of the priority condition table 50. Priority conditions 50a, details 50b and setting information 50c are recorded as the priority condition table 50. The detailed process is shown as the details 501), and the setting information 50c, shows which priority condition should be applied. It is assumed, for example, the job execution waiting time is selected as the priority condition 50a. In this case, the image processing device which requires the shortest job execution waiting time is extracted. It is assumed, for example, the number of the waiting job is selected as the priority condition 50a. In this case, the image processing device which has the least number of the waiting job is extracted. It is assumed, for example, the number of the connecting portable terminal is selected as the priority condition 50a. In this case, the image processing device which has the least number of the connecting portable terminal 4 is extracted. This, however, is just an example. Any condition may be set as the priority condition 50a. In the example of FIG. 11, only one of the priority conditions 50a is applied. One or more priority condition 50a may be set, and the one or more condition may be applied based on an order of the priorities. The order of the priorities may be determined, and the job execution waiting time may be given the highest priority, for example. The number of the waiting job is given the higher priority, and the number of the connecting portable terminal 4 is given not so high priority. In this case, the image processing device is extracted based on each priority condition. The image processing device obtained with each priority condition having the highest, higher and not so high priority is multiplied by each predetermined number of count r1, r2 and r3 (r1>r2>r3). The image processing device obtains the largest number may be determined as the image processing device that establishes the communication.

Referring back to FIG. 10, after either of the image processing devices is extracted based on the order of the priorities (step S108), the first image processing device 1 determines the extracted image processing device as the image processing device which establishes new communication with the portable terminal 4 (step S105), and completes the process.

According to the second embodiment, the load statuses at the first image processing device 1 and the second image processing device 2 are compared. The image processing device to which the less load is applied is determined as the image processing device which establishes new communication with the portable terminal 4 as a result of the comparison. Thus, the image processing device which is allowed to process the new job from the portable terminal 4 efficiently may be determined accurately.

It is assumed that the load applied to the first image processing device 1 is increased and the load status at the first image processing device 1 meets the predetermined condition, for example, in the second embodiment. In this case, the radio field strengths from the first and the second image processing devices 1 and 2 are adjusted as described above after comparing the load statuses at the first image processing device 1 and the second image processing device 2. If the adjustment is carried out, and the radio field strength from the first image processing device 1 is configured lower than the radio field strength from the second image processing device 2, the first image processing device 1 monitors its load status at a regular basis. The load applied to the first image processing device 1 may be reduced and the load status at the first image processing device 1 may not meet the predetermined condition. In this case, the first image processing device 1 obtains again the load status information of the second image processing device 2, and compares the load statuses at the first image processing device 1 and the second image processing device 2. The image processing device to which the less load is applied is determined as the image processing device which establishes new communication with the portable terminal 4. The adjustment may be carried out to relatively increase the radio field strength from the image processing device which is determined to establish the new communication higher than the radio field strength from another device based on the determination.

The first image processing device 1 may compare the statuses at the first image processing device 1 and the second image processing device 2 by obtaining the load status information from the second image processing device 2 before carrying out the adjustment of the radio field strengths not only when the load applied to the first image processing device 1 is increased and the load status at the first image processing device 1 meets the predetermined condition (first condition) but also the load applied to the first image processing device 1 is reduced and the load status at the first image processing device 1 meets the predetermined condition (second condition). The first image processing device 1 compares the load statuses, and determines the image processing device to which the less load is applied as the image processing device which establishes new communication with the portable terminal 4. The first image processing device 1 then carries out the adjustment to relatively increase the radio field strength from the image processing device which establishes new communication higher than another device based on the determination. To be more specific, even when not so heavy load is applied to the first image processing device 1, the heavy load may be applied to the second image processing device 2. In such a case, the first image processing device 1 waits until the load applied to the first image processing device 1 is reduced and the load status at the first image processing device 1 meets the predetermined condition (second condition). The first image processing device 1 then obtains the load status information from the second image processing device 2, and determines the image processing device to which the less load is applied as the image processing device which establishes new communication. The first image processing device 1 carries out the adjustment of the radio field strengths, thereby causing the determined image processing device to which the less load is applied to establish the new communication with the portable terminal 4, resulting in the efficient job execution.

Third Embodiment

A third embodiment when there are multiple second image processing devices 2 is described next. The image processing system 5 of the third embodiment includes multiple second image processing devices 2. The communication determining part 23 of the first image processing device 1 compares the load status at each of the second image processing devices 2, and determines one of the image processing devices to which the least load is applied establishes new communication with the portable terminal 4. The radio adjuster 24 relatively increases the radio field strength from the image processing device thereby determined higher than the radio field strengths from the other second image processing devices. The radio field strength from the image processing device to which the least load is applied of the multiple second image processing devices 2 becomes relatively high. For executing the new job, the portable terminal 4 automatically connects to the image processing device which is configured to emit the highest-intensity radio waves. When the user operates the portable terminal 4 to send the job, it is not necessary for the user to determine by himself/herself to establish connection with which of the multiple image processing devices 2. The portable terminal 4 is capable of automatically connecting to the second image processing device 2 to which the least load is applied.

The procedure performed at the first image processing device 1 of the third embodiment is basically the same as that of the second embodiment (the flowchart of FIG. 9). To be more specific, the same process as the process in steps S71 to S74 and steps S76 to S77 of FIG. 9 is performed. The status analysis (step S75) and the radio field strength adjustment (step S78) are different from the second embodiment as described below.

Figure 12:
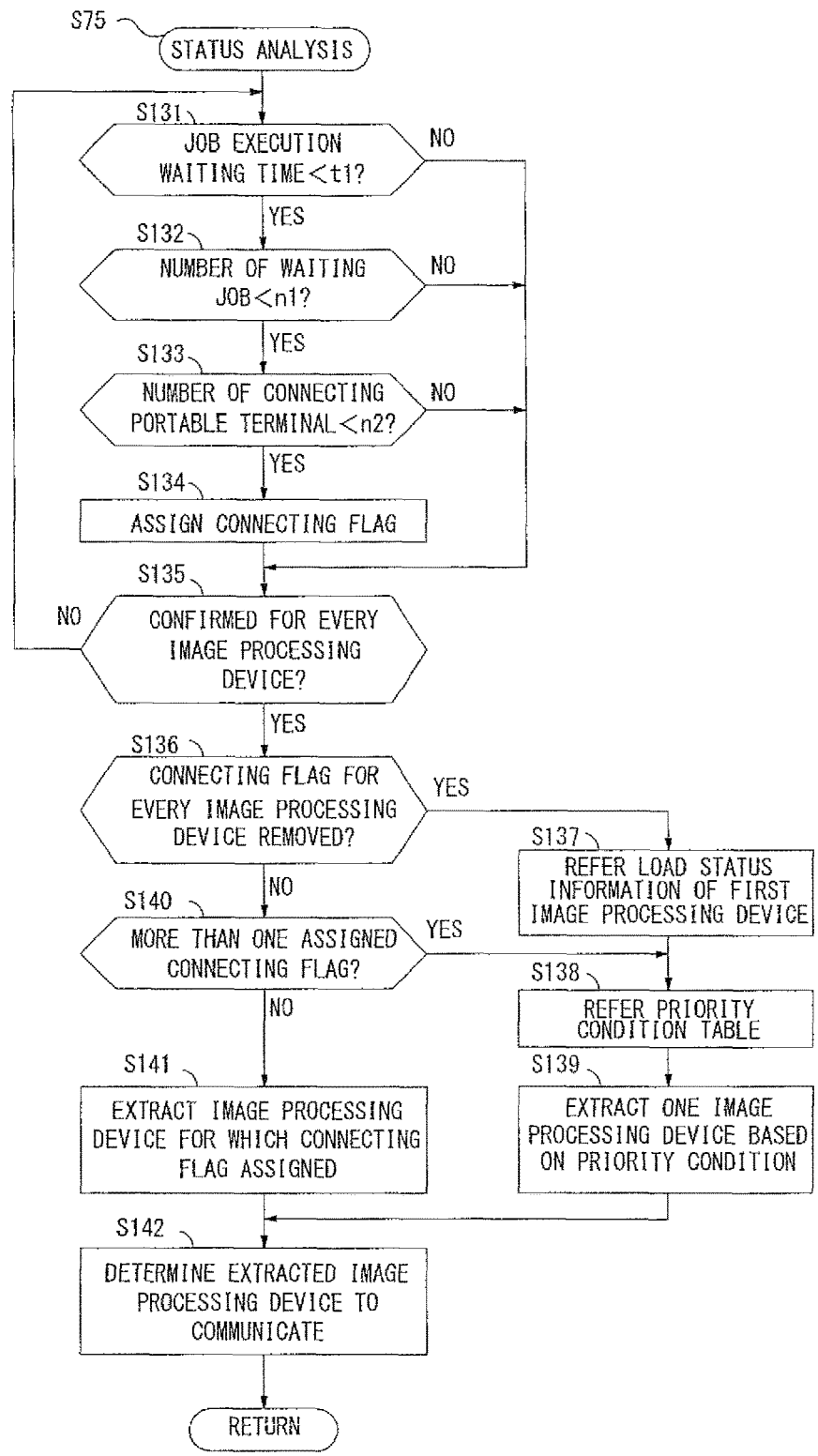
FIG. 12 is a flowchart explaining the detailed exemplary sequential procedure of the status analysis of the third embodiment.

FIG. 12 is a flowchart explaining the detailed exemplary sequential procedure of the status analysis (step S75) of the third embodiment. The first image processing device 1 analyzes the load status information obtained from each of the multiple second image processing devices 2, and determines if the execution waiting time for the new job is shorter than the predetermined time (t1) for each second image processing device 2 (step S131). If the first image processing device 1 determines that the job execution waiting time is shorter than the predetermined time (t1) (when a result of step S131 is YES), it determines whether or not the number of the waiting job at the corresponding second image processing device 2 is less than the predetermined number (n1) (step S132). If the first image processing device 1 determines that the number of the waiting job is less than the predetermined number (n1) (when a result of step S132 is YES), it determines whether or not the number of the portable terminal 4 to which the corresponding second image processing device 2 is currently connecting is less than the predetermined number (n2) (step S133). When the first image processing device 1 determines that the number of the portable terminal 4 to which the corresponding second image processing device 2 is currently connecting is less than the predetermined number (n2) (when a result of step S133 is YES), it assigns a connection flag to the corresponding second image processing device 2 (step S134). When any of the conditions in steps S131 to S133 is not met (when any result of steps S131 to S133 is NO), the process in step S134 is skipped. Each process in the aforementioned steps S131 to 134 is performed for all the second image processing devices 2 (step S135).

When the process in the aforementioned steps S131 to 134 is performed for all the second image processing devices 2 (when a result of step S135 is YES), the first image processing device 1 determines if the connection flag is removed for all the second image processing devices 2 (step S136). If the connection flag is removed for all the second image processing devices 2 (when a result of step S136 is YES), it is considered that none of the second image processing devices 2 has definitely less load than the first image processing device 1. Therefore, the first image processing device 1 refers the load status information of the first image processing device 1 (step S137), then refers the priority condition table 50 stored in the storage 11 (step S138) to compare the load statuses at the first image processing device and all the second image processing devices 2. The first image processing device 1 then extracts one of the first and the second image processing devices 1 and 2 based on the predetermined priority conditions (step S139). Application of the priority condition table 50 and the priority conditions is the same as described in the second embodiment. After one of the image processing devices is extracted, the first image processing device 1 determines the extracted image processing device as the image processing device which establishes new communication with the portable terminal 4 (step S142), and completes the process.

If the connection flag is not removed for all the second image processing devices 2 in step S136 (when a result of step S136 is NO), it further determines whether or not the connection flag is assigned to more than one second image processing device 2 (step S140). The connection flag may be assigned to only one second image processing device 2 (when a result of step S140 is NO). In this case, it is considered the second image processing device 2 to which the connection flag is assigned has the least load. The first image processing device 1 therefore extracts the second image processing device 2 to which the connection flag is assigned (step S141), and determines the extracted second image processing device 2 as the image processing device which establishes new communication with the portable terminal 4 (step S142). The connection flag may be assigned to more than one second image processing device 2 (when a result of step S140 is YES). In this case, the first image processing device 1 refers the priority condition table 50 (step S138) to determine one of the second image processing devices 2 to which the connection flag is assigned has the least load. The first image processing device 1 extracts one of the second image processing devices 2 based on the predetermined priority conditions (step S139). The first image processing device 1 determines the extracted second image processing device 2 as the image processing device which establishes new communication with the portable terminal 4 (step S142), and completes the process. Through the status analysis of the third embodiment, the image processing device to which the least load is applied of the multiple second image processing devices 2 may be extracted. Thus, the image processing device which is allowed to process the new job from the portable terminal 4 efficiently may be extracted.

Figure 13:
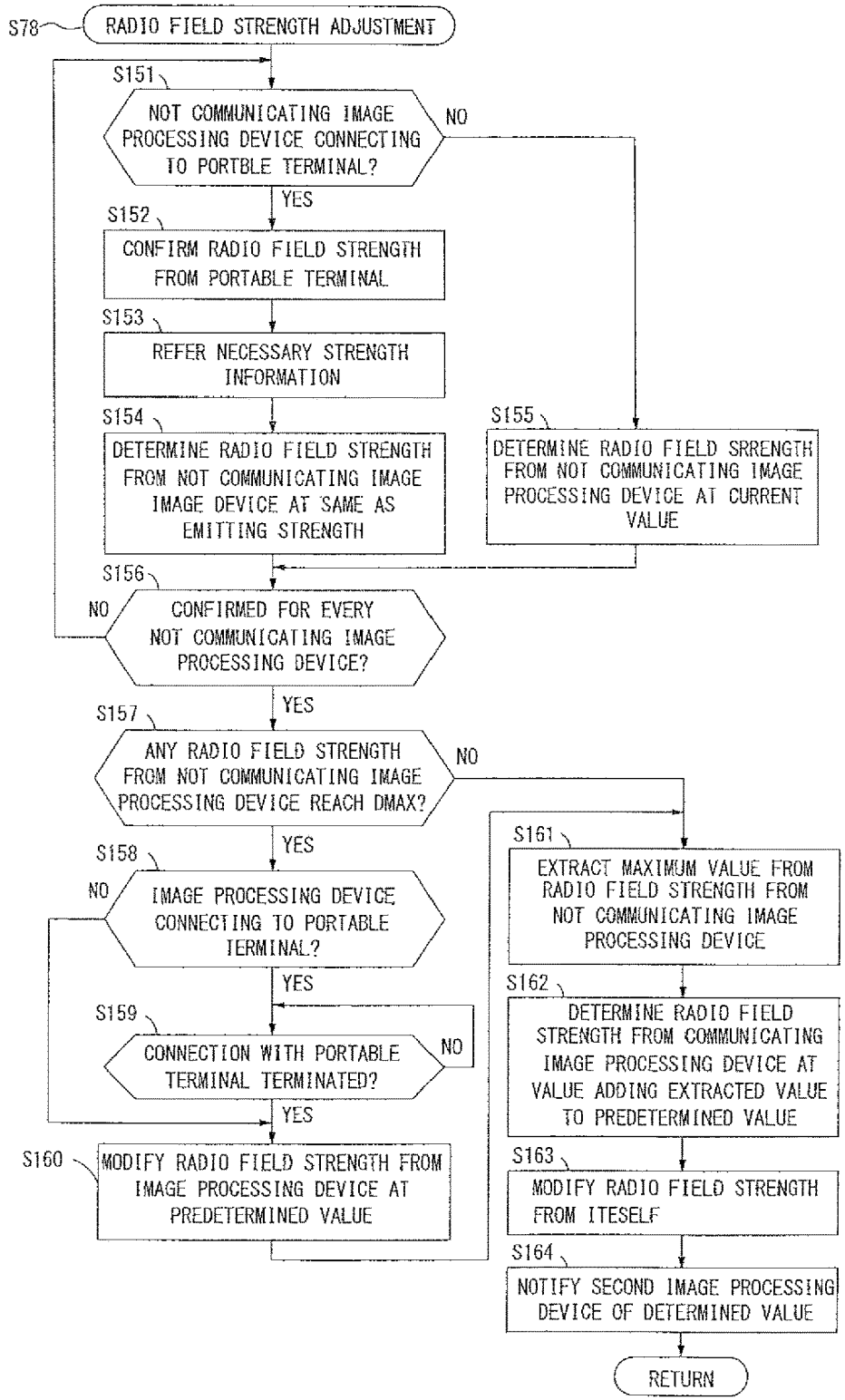
FIG. 13 is a flowchart explaining the detailed exemplary sequential procedure of the radio field strength adjustment of the third embodiment.

FIG. 13 is a flowchart explaining the detailed exemplary sequential procedure of the radio field strength adjustment (step S78 of FIG. 9) of the third embodiment. The first image processing device 1 determines the image processing device which establishes new communication with the portable terminal 4. When the highest-intensity radio waves are not emitted from the determined image processing device compared to the other image processing devices, the first image processing device 1 relatively increases the radio field strength from the determined image processing device higher than the radio field strengths from the other image processing devices by carrying out the radio field strength adjustment. The first image processing device 1 determines whether or not any portable terminal 4 has already connecting to the image processing device which does not establish communication (step S151). When determining that the portable terminal 4 has already connecting (when a result of step S151 is YES), the first image processing device 1 confirms the radio field strength received from the portable terminal 4 by the image processing device which does not establish communication (step S152). The radio field strength thereby received may be obtained together with the load status information from each second image processing device 2. Alternatively, the first image processing device 1 may send the request to the second image processing device 2 to obtain after finding out that the portable terminal 4 has already connecting through the load status information analysis.

After confirming the radio field strength received from the portable terminal 4, the first image processing device 1 refers the necessary strength information 25 stored in the storage 11 (step S153). The first image processing device 1 determines the radio field strength from the image processing device which does not establish communication at the same value as the emitting strength 25b required for maintenance of the current connection with the portable terminal 4 (step S154). No portable terminal 4 may be connecting to the image processing device which does not establish communication (when a result of step S151 is NO). In this case, the first image processing device 1 determines the radio field strength from the image processing device which does not establish communication at the current value (step S155), and skips the process in steps S152 to S154. The radio field strength from the image processing device which does not establish communication may be decreased to the predetermined value in step S155. The first image processing device 1 performs the aforementioned process in steps S151 to S155 for each image processing device which does not establish communication (step S156), thereby determining every radio field strength from the respective image processing devices which do not establish new communication.

After every radio field strength from the respective image processing devices which do not establish new communication with the portable terminal 4 is determined through the process in steps S151 to S155 (when a result of step S156 is YES), the first image processing device 1 determines if any radio field strength from the image processing device which does not establish communication reaches the maximum emitting strength (Dmax) (step S157). No radio field strength from the image processing device which does not establish new communication may reach the Dmax (when a result of step S157 is NO). In this case, the first image processing device 1 extracts the image processing device which emits the highest-intensity radio waves of the image processing devices which do not establish new communication (step S161). The first image processing device 1 determines the target value of the radio field strength from the image processing device which is determined to establish new communication at the value obtained by adding the predetermined value to the value extracted in step S161 (step S162). When the radio field strength from the first image processing device 1 is different from the determined value, the first image processing device 1 modifies the radio field strength from the first image processing device 1 (step S163). Also, the first image processing device 1 notifies all of the second image processing devices 2 of the determined target value, and completes the process (step S164). In the example of FIG. 13, the first image processing device 1 notifies all of the second image processing devices 2 of the determined target value. The current radio field strengths from some second image processing devices may be the same value as the determined target value. In such a case, the first image processing device 1 is not always required to notify such second image processing devices 2 of the determined target value.

One or more radio field strength from the image processing device which does not establish new communication may reach the Dmax (when a result of step S157 is YES). In this case, the first image processing device 1 determines if the portable terminal 4 is connecting to the image processing device (step S158). The portable terminal 4 may be connecting to the image processing device (step S158 is YES). In this case, the first image processing device 1 then determines if the connection between the image processing device and the portable terminal 4 is terminated (step S159). The first image processing device 1 then modifies the radio field strength from the image processing device by decreasing the value to the predetermined value (step S160). To be more specific, when the portable terminal 4 has already connecting to the image processing device, it is considered the necessary emitting strength 25b for maintenance of the connection is the same value as the Dmax. Hence, the radio field strength from the image processing device cannot be modified as the connection with the portable terminal 4 is established. The radio field strength from the image processing device may be modified after the connection with the portable terminal 4 is terminated. The portable terminal 4 may not be connecting to the image processing device which emits the radio waves at the frequency, Dmax (step S158 is NO). In this case, the first image processing device 1 modifies the radio field strength from the image processing device by decreasing it to the predetermined value (step S160). The first image processing device 1 then performs the aforementioned process in steps S161 to S164 after the process in steps S158 to S160, and completes the process. In the example of FIG. 13, the first image processing device 1 waits until the connection between the portable terminal 4 and the image processing device is terminated in step S159. The first image processing device 1 may modify the radio field strength from the image processing device which is determined to establish new communication at the Dmax. To be more specific, it is assumed that the first image processing device 1 waits until the current connection between the portable terminal 4 and the image processing device which does not establish new communication is terminated as the radio field strength from the image processing device which is determined to establish new communication is not configured at the maximum emitting value. In this case, if the user operates the portable terminal 4 for execution of the new job, the portable terminal 4 is connected to the image processing device which does not establish new communication but emits the highest-intensity radio waves. Hence, the image processing device which is determined to establish new communication is also configured at the maximum emitting value as the same as the image processing device which does not establish new communication but emits the highest-intensity radio waves. Thus, the portable terminal 4 which is trying to send the new job may be connected to the image processing device which is determined to establish new communication. The radio field strength from the image processing device which is determined to establish new communication with the portable terminal 4 is adjusted to be higher than the radio field strengths from the other image processing devices as a result of the radio field strength adjustment. When the user operates the portable terminal 4 to send the new job, it is not necessary for the user to determine by himself/herself to establish connection with which of the multiple second image processing devices 2. The portable terminal 4 is capable of automatically connecting to the image processing device to which the least load is applied and not busy, resulting in efficient job execution.

It is assumed that the load applied to the first image processing device 1 is increased and the load status at the first image processing device 1 meets the predetermined condition, for example. In this case, according to in the third embodiment, the radio field strengths from the first image processing device 1 and the multiple second image processing devices 2 are adjusted as described above. If the adjustment is carried out, and the radio field strength from the first image processing device 1 is configured lower than the radio field strengths from the second image processing devices 2, the first image processing device 1 monitors its load status at a regular basis. The load applied to the first image processing device 1 may be reduced and the load status at the first image processing device 1 may not meet the predetermined condition. In this case, the first image processing device 1 obtains again the load status information of each second image processing device 2 to determine the image processing device to which the least load is applied as the image processing device which establishes new communication with the portable terminal 4. The adjustment of the radio field strengths from the first and the second image processing devices 1 and 2 may be carried out based on the determination. As a result, the image processing device to which the least load is applied establishes new communication with the portable terminal 4, resulting in efficient job execution.

The first image processing device 1 may determine the image processing device to which the least load is applied as the device which establishes new communication with the portable terminal 4 and carry out the adjustment of the radio field strengths from the first and the second image processing devices 1 and 2 based on the determination not only when the load applied to the first image processing device 1 is increased and the load status at the first image processing device 1 meets the predetermined condition (first condition) but also the load applied to the first image processing device 1 is reduced and the load status at the first image processing device 1 meets the predetermined condition (second condition). The above-described determination of the image processing device is made by obtaining the load status information from each second image processing device 2. To be more specific, even when not so heavy load is applied to the first image processing device 1, the heavy load may be applied to some of the multiple second image processing devices 2. In such a case, the first image processing device 1 waits until the load applied to the first image processing device 1 is reduced and the load status at the first image processing device 1 meets the predetermined condition (second condition). The first image processing device 1 then carries out the adjustment of the radio field strengths between the first and the second image processing devices 2, thereby preventing some of the multiple second image processing devices 2 from being applied the heavy load.

Fourth Embodiment

A forth embodiment of the present invention is described next. The status detecting part 21 of the first image processing device 1 on the image processing system 5 of the fourth embodiment establishes communication with the portable terminal 4 and receives the job, thereby detecting increase in the load applied to the first image processing device 1. The first image processing device 1 further includes an execution determining part 70 which determines if the first image processing device 1 is capable of executing the job by analyzing the job. The communication determining part 23 of the first image processing device 1 determines the second image processing device 2 establishes new communication with the portable terminal 4 regardless of the load applied to the first image processing device 1 if the execution determining part 70 determines that the first image processing device 1 is capable of executing the job. The radio adjuster 24 relatively increases the radio field strength from the second image processing device 2 higher than the radio field strength from the first image processing device 1. The first image processing device 1 detects the increase in the load in response to receiving the job, and analyzes the job. The first image processing device 1 then determines if the job can be executed on the first image processing device 1. When determining that the job cannot be executed on the first image processing device 1, the first image processing device 1 is allowed to determine the second image processing device 2 to establish new communication with the portable terminal 4 regardless of the load applied to the first image processing device 1, and carries out the adjustment of the radio field strengths. Hence, the portable terminal 4 is allowed to establish new communication with the image processing device which is capable of executing the job, thereby realizing the smooth job execution.

Figure 14:
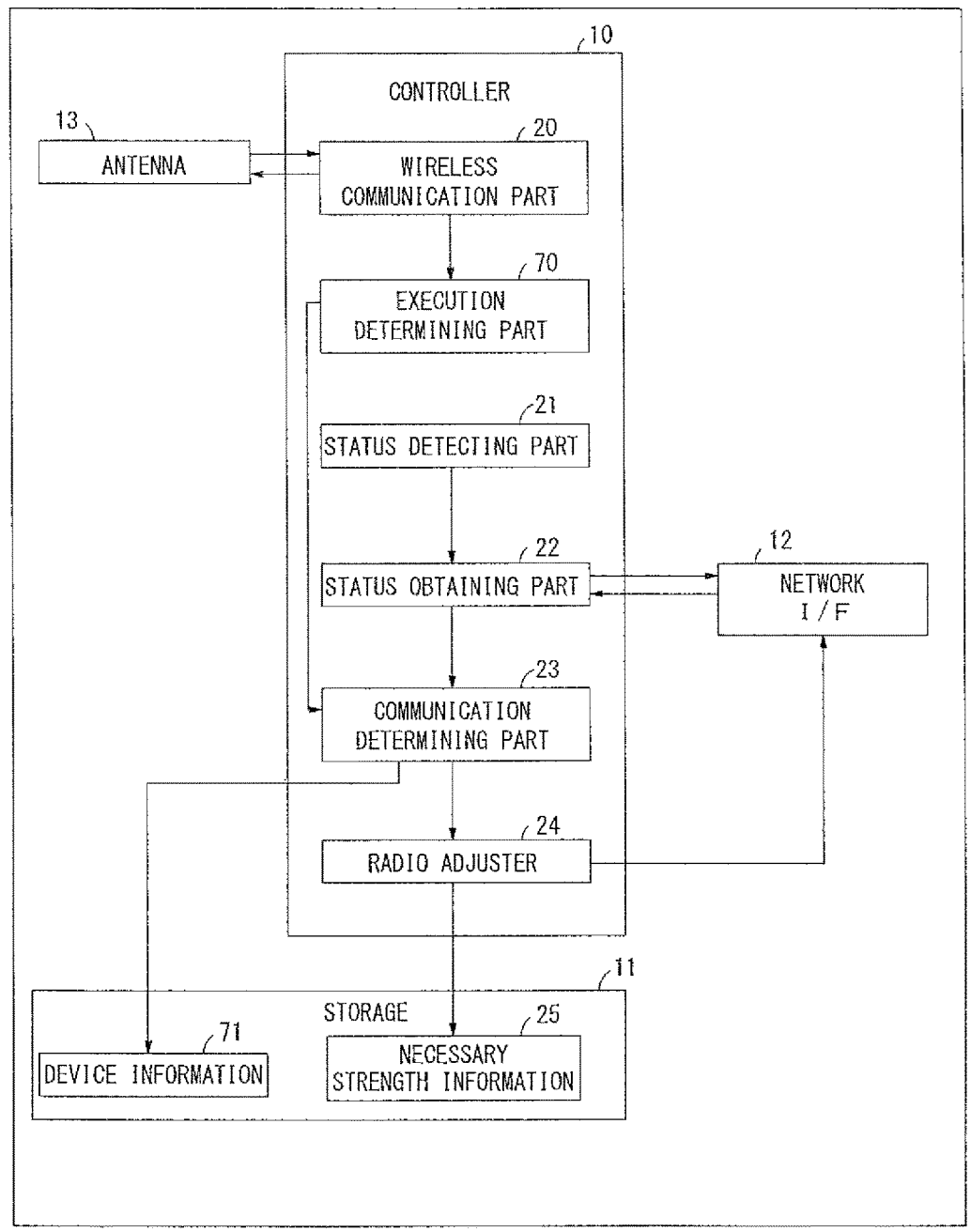
FIG. 14 shows an example of a functional structure of the first image processing device of the fourth embodiment.

FIG. 14 is a block diagram showing an example of a functional structure of the first image processing device 1 of the fourth embodiment. The first image processing device 1 includes the network interface 12 and the antenna 13 that are equipped with the same functions as those of the first embodiment (FIG. 2). The first image processing device 1 of the fourth embodiment includes the wireless communication part 20, the status detecting part 21, the status obtaining part 22, the communication determining part 23 and the radio adjuster 24 that are served by the controller 10 as the same as the first image processing device 1 of the first embodiment. The execution determining part 70 determines if the job can be executed on the first image processing device 1 by analyzing the received job. It is assumed, for example, even though the first image processing device 1 is not capable of producing the printed output in color, the job including printing in color may be received by the first image processing device 1. In this case, the execution determining part 70 analyzes the received job, and determines that the job cannot be executed on the first image processing device 1 because it includes the printing in color. After determining that the job cannot be executed on the first image processing device 1, the execution determining part 70 notifies the communication determining part 23 of the determination result. When the execution determining part 70 determines that the job cannot be executed on the first image processing device 1, the communication determining part 23 makes the determination. The communication determining part 23 determines that the first image processing device 1 should not maintain the communication with the portable terminal 4 for execution of the job regardless of the load and the second image processing device 2 should establish new communication with the portable terminal 4 to execute the job. As long as the job cannot be executed on the first image processing device 1, it is needless to maintain the communication between the first image processing device 1 and the portable terminal 4 regardless of the load on the first image processing device 1. Before determining that the second image processing device 2 establishes new communication with the portable terminal 4, the communication determining part 23 may refer device information 71 relating to the second image processing device 2 in the storage 11. Information relating to the functions such as details or a rate of process which can be executed at the second image processing device 2 is registered as the device information 71. The communication determining part 23 refers the device information 71, thereby determining if the job can be executed on the second image processing device 2. Thus, the communication determining part 23 is allowed to accurately determine to establish the communication between the portable terminal 4 and the image processing device which is capable of executing the job. After the communication determining part 23 determines the second image processing device 2 establishes new communication with the portable terminal 4, the radio adjuster 24 adjusts to increase the radio field strength from the second image processing device 2 to be higher than the radio field strength from the first image processing device 1.

Figure 15:
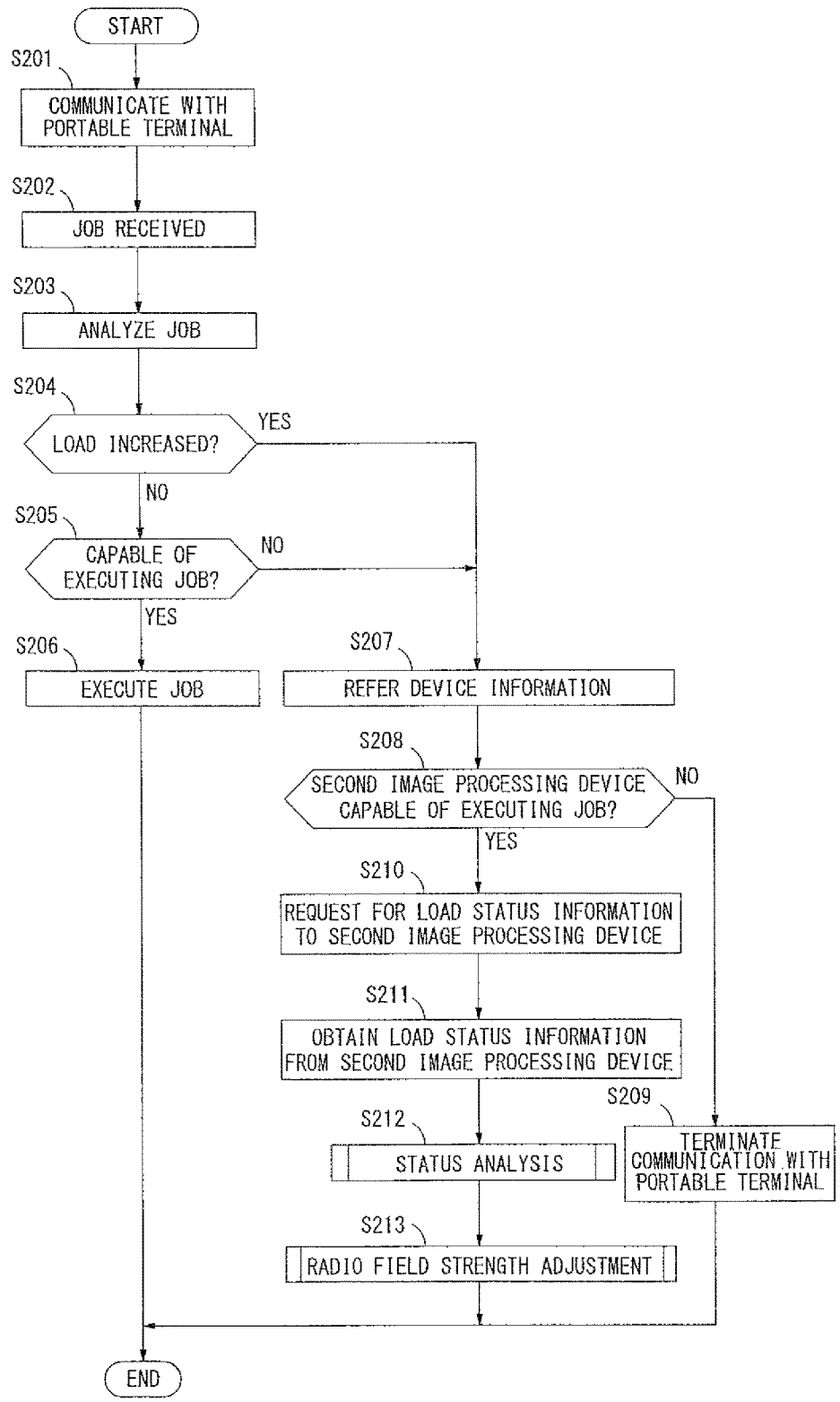
FIG. 15 is a flowchart showing an example of the procedure performed at the first image processing device of the fourth embodiment.

FIG. 15 is a flowchart explaining the exemplary sequential procedure of the process performed at the first image processing device 1 of the fourth embodiment. After establishing the communication with the portable terminal 4 (step S201), the first image processing device 1 receives the job (step S202). The first image processing device 1 then analyzes the job (step S203). The first image processing device 1 determines if the load applied to which has increased (step S204). The first image processing device 1 may determine that the load applied to which has not increased (when a result of step S204 is NO). In this case, the first image processing device 1 determines if it is capable of executing the received job (step S205). The first image processing device 1 may determine that it is capable of executing the received job (when a result of step S205 is YES). The first image processing device 1 then executes the job (step S206), and completes the process. The first image processing device 1 may determine that the load applied to which has increased (when a result of step S204 is YES). In this case, the first image processing device 1 refers the device information 71 (step S207) to determine whether or not the second image processing device 2 is capable of executing the job (step S208). Also, the first image processing device 1 may determine that it is not capable of executing the received job (when a result of step S205 is NO). In this case, the first image processing device 1 determines it does not establish communication with the portable terminal 4 regardless of the load because it is not capable of executing the job. After making the determination, the first image processing device 1 refers the device information 71 (step S207) to determine whether or not the second image processing device 2 is capable of executing the job (step S208). In the example of FIG. 15, the first image processing device 1 determines whether or not the second image processing device 2 is capable of executing the job by referring the device information 71. It is not always necessary for the first image processing device 1 to determine. The first image processing device 1 may make an inquiry whether or not the second image processing device 2 is capable of executing the job to the second image processing device 2, and determine after receiving the response from the second image processing device 2.

The first image processing device 1 may determine that the second image processing device 2 is capable of executing the job (when a result of step S208 is YES). In this case, the first image processing device 1 sends the request for the load status information to the second image processing device 2 (step S210) to obtain the load status information from the second image processing device 2 (step S211). After obtaining the load status information, the first image processing device 1 performs a status analysis (step S212), thereby determining one of the multiple second image processing devices 2 to which the least load is applied when there are multiple second image processing devices 2. The status analysis (step S212) is basically the same as the status analysis of the third embodiment (the flowchart of FIG. 12). The process in step S137 of FIG. 12 is not performed in the status analysis of the fourth embodiment. After determining the second image processing device 2 which establishes new communication with the portable terminal 4 through the status analysis (step S212), then a radio field strength adjustment (step S213) is performed. The first image processing device 1 adjusts to increase the radio field strength from the second image processing device 2 which is determined to establish the new communication to be higher than the radio field strengths from the other second image processing devices 2, and completes the process. The sequential procedure of the radio field strength adjustment (step S213) is the same as the radio field strength adjustment of the third embodiment (the flowchart of FIG. 13).

The first image processing device 1 may determine that the second image processing device 2 is not capable of executing the job in step S208 (when a result of step S208 is NO). In this case, the first image processing device 1 terminates the communication with the portable terminal 4 and completes the process (step S209). It is considered that it may take long to execute the job at the first image processing device 1 or the first image processing device 1 is not capable of executing the job. Also, the second image processing device 2 is not capable of executing the job either. Therefore, it is pointless to continue the communication between the first image processing device 1 and the portable terminal 4. When the first image processing device 1 is capable of executing the job but it takes long for it, the first image processing device 1 may not terminate the communication with the portable terminal 4 and execute the job, which is different from the above-described process.

On the image processing system 5 of the fourth embodiment, the execution determining part 70 analyzes the job received from the portable terminal 4, and determines if the job can be executed on the first image processing device 1. When the execution determining part 70 determines that the job cannot be executed on the first image processing device 1, the communication determining part 23 determines that the second image processing device 2 should establish new communication with the portable terminal 4 regardless of the load on the first image processing device 1. The radio adjuster 24 adjusts to increase the radio field strength from the second image processing device to be higher than the radio field strength from the first image processing device 1. As a result, the portable terminal 4 is allowed to have the smooth execution of the job by establishing the communication with the image processing device which is capable of executing the job.

Modifications

The present invention is not to be limited to the aforementioned embodiments but can be modified in various ways.

As an example, in the aforementioned embodiments, the first image processing device 1 adjusts the radio field strengths from the first and the second image processing devices 1 and 2. Alternatively, the second image processing device 2 may adjust the radio field strengths from the first and the second image processing devices 1 and 2. Alternatively, both the first and the second image processing devices 1 and 2 may adjust the radio field strengths.

In the aforementioned embodiments, the status detection is performed when the first image processing device 1 detects the change in its load status. However, this is given not for limitation. As an example, the first image processing device 1 may perform the status detection in response to detecting an error which interrupts the execution of the job such as a paper jam caused at the first image processing device 1. Alternatively, the second image processing device may inform the first image processing device 1 in response to detecting the change or the error of the load status at the second image processing device 2. In this case, the process after the status detection may be performed at the first image processing device 1 or at the second image processing device 2.

What is claimed is:

1. An image processing system comprising:
   a first image processing device that establishes wireless communication via radio waves with a portable terminal via first radio waves emitted from the first image processing device; and
   a second image processing device that establishes wireless communication with the portable terminal via second radio waves emitted from the second image processing device, and communicates with the first image processing device, wherein
   the first image processing device comprises a first processor,
   the first processor executes a process comprising:
      obtaining information relating to a load status at the first image processing device and a load status at the second image processing device;
      analyzing the information relating to the load status at the first image processing device and the load status at the second image processing device, and determining that the first image processing device does not establish wireless communication with the portable terminal when the load status of the first image processing device is higher than the load status of the second image processing device based on a result of the analyzing; and
      adjusting a radio field strength of the first radio waves to lower the radio field strength of the first radio waves below a radio field strength of the second radio waves when the first image processing device determines not to establish wireless communication with the portable terminal.

2. The image processing system according to claim 1, wherein
the first processor determines a target value which makes the radio field strength of the second radio waves higher than the radio field strength of the first radio waves and notifies the second image processing device of the target value after the first image processing device determines not to establish wireless communication with the portable terminal, and
the second processor modifies the radio field strength of the second radio waves depending on the notification of the target value determined by the first processor.

3. The image processing system according to claim 1, wherein
the first processor adjusts the radio field strength of the first radio waves to be higher than the radio field strength of the second radio waves when the first image processing device determines to communicate with the portable terminal.

4. The image processing system according to claim 1, wherein
the first processor of the first image processing apparatus further executes:
detecting a change in a load status at the first image processing device; and
sending a request for information relating to a load status at the second image processing device to the second image processing device when the change in the load status at the first image processing device is detected,
the second image processing device comprises a second processor, and
the second processor notifies the first image processing device of the information relating to the load status at the second image processing device in response to the request from the first image processing device.

5. The image processing system according to claim 4, wherein
when the first image processing device is communicating with the portable terminal at the detection of the change in the load status at the first image processing device, the first processor keeps the radio field strength to maintain the communication and increases the radio field strength of the second radio waves higher than the radio field strength of the first radio waves until the communication is terminated.

6. The image processing system according to claim 5, wherein
the first image processing device further comprises: a storage in which necessary strength information relating to the radio field strength of the first radio waves which is required for maintenance of the communication with the portable terminal is stored, and
the first processor refers the necessary strength information and keeps the radio field strength of the first radio waves not to be lower than the necessary strength for maintenance of the communication.

7. The image processing system according to claim 4, wherein
the first processor detects that the load at the first image processing device is increased in response to receiving a job from the portable terminal.

8. The image processing system according to claim 1, wherein the portable terminal establishes a connection with the second image processing device based on the radio field strength of the second radio waves being higher than the radio field strength of the first radio waves after the adjustment of the radio field strength of the first radio waves when the load status of the first image processing device is higher than the load status of the second image processing device.

9. An image processing device capable of establishing wireless communication with a portable terminal comprising a processor via first radio waves emitted from the image processing device, wherein
the processor executes a process comprises:
obtaining information relating to a load status at the image processing device and a load status at the another image processing device;
analyzing the information relating to the load status at the image processing device and the load status at the another image processing device, and determining that the image processing device does not establish wireless communication with the portable terminal when the load status of the image processing device is higher than the load status of the another image processing device based on results of the analyzing; and
adjusting a radio field strength of the first radio waves to lower the radio field strength of the first radio waves below a radio field strength of second radio waves emitted from the another image processing device when the image processing device determines not to establish wireless communication with the portable terminal.

10. The image processing device according to claim 9, wherein
the processor determines a target value which makes the radio field strength of the second radio waves high and notifies the another image processing device of the target value, thereby modifying the radio field strength of the second radio waves when the image processing device determines not to establish wireless communication with the portable terminal.

11. The image processing device according to claim 9, further comprising:
a storage in which necessary strength information relating to a radio field strength which is required for maintenance of the communication with the portable terminal is stored, and
the processor refers the necessary strength information and keeps the radio field strength of the first radio waves not to be lower than the necessary strength for maintenance of the communication.

12. The image processing device according to claim 9, wherein
the processor adjusts the radio field strength of the first radio waves to be higher than the radio field strength of the second radio waves in response to determining to communicate with the portable terminal.

13. The image processing device according to claim 9, wherein the processor further executes:
detecting a change in a load status at the image processing device; and
sending a request for information relating to a load status at another image processing device to the another image processing device when the change in the load status at the image processing device is detected.

14. The image processing device according to claim 13, wherein
as the communication with the portable terminal has already been established at the detection of the change in the load status, the processor keeps the radio field strength of the first radio waves to maintain the communication and increases the radio field strength of the second radio waves higher than the radio field strength of the first radio waves until the communication is terminated when the image processing device determines not to establish wireless communication with the portable terminal.

15. The image processing device according to claim 13, wherein
the processor detects that the load is increased in response to receiving a job from the portable terminal.

16. A non-transitory computer readable recording medium in which a computer program to be executed by an image processing device capable of establishing wireless communication with a portable terminal via first radio waves emitted from the image processing device and communicating with another image processing device which is capable of establishing wireless communication with the portable terminal via second radio waves emitted from the another image processing device is stored, execution of the program by the image processing device causing the image processing device to execute the steps of:
communicating with the portable terminal;
obtaining information relating to a load status at the image processing device and a load status at the another image processing device;
analyzing the information relating to the obtained load status at the image processing device and the obtained load status at the another image processing device, and determining that the image processing device does not establish wireless communication with the portable terminal when the load status of the image processing device is higher than the load status of the another image processing device based on results of the analyzing; and
adjusting a radio field strength of the first radio waves to lower the radio field strength of the first radio waves below a radio field strength of the second radio waves in response to determining not to communicate with the portable terminal.

17. The computer readable recording medium according to claim 16, further causing the image processing device to execute the steps of:
detecting a change in a load status at the image processing device;
obtaining information relating to a load status at the another image processing device when the change in the load status at the image processing device is detected.

18. The computer readable recording medium according to claim 16, wherein
the image processing device determines a target value which makes the radio field strength of the second radio waves high and notifies the another image processing device of the target value, thereby modifying the radio field strength of the second radio waves when the image processing device determines not to establish wireless communication with the portable terminal.

19. The computer readable recording medium according to claim 17, wherein
as the communication with the portable terminal has already been established at the detection of the change in the load status, the image processing device keeps the radio field strength of the first radio waves to maintain the communication and increases the radio field strength of the second radio waves higher than the radio field strength of the first radio waves until the communication is terminated when the image processing device determines not to establish wireless communication with the portable terminal.

20. The computer readable recording medium according to claim 16, further causing the image processing device to execute the steps of:
storing, in a storage of the image processing device, necessary strength information relating to a radio field strength which is required for maintenance of the communication with the portable terminal, and
the image processing device refers the necessary strength information and keeps the radio field strength of the first radio waves not to be lower than the necessary strength for maintenance of the communication.

21. The computer readable recording medium according to claim 16, wherein
the image processing device adjusts the radio field strength of the first radio waves to be higher than the radio field strength of the second radio waves in response to determining to communicate with the portable terminal.

22. The image processing device according to claim 17, wherein
the image processing device detects that the load is increased in response to receiving a job from the portable terminal.

23. A processing device comprising:
a processor; and
a communication interface for communication with multiple image processing devices capable of establishing wireless communication with a portable terminal via radio waves emitted from the image processing devices, wherein
the processor executes a process comprises:
receiving load statuses at the multiple image processing devices via the communication interface;
determining one of the multiple image processing devices that communicates with the portable terminal based on the received load statuses at the multiple image processing devices;
determining target values which make the radio field strength of radio waves emitted from the image processing device determined to communicate with the portable terminal higher than the radio field strengths of radio waves emitted from rest of the multiple image processing devices for each of the multiple image processing devices; and
notifying the multiple image processing devices of the respective determined target values, and modifying the radio field strengths of the radio waves emitted from the multiple image processing devices.

24. A non-transitory computer readable recording medium in which a computer program to be executed by a processing device capable of communicating with multiple image processing devices that establish wireless communication with a portable terminal with each other via radio waves emitted from the image processing devices is stored, execution of the program by the processing device causing the processing device to execute the steps of:
receiving load statuses at the multiple image processing devices;
determining one of the multiple image processing devices that communicates with the portable terminal based on the received load statuses at the multiple image processing devices; and
determining target values which make the radio field strength of radio waves emitted from the image processing device determined to communicate with the portable terminal higher than the radio field strengths of radio waves emitted from rest of the multiple image processing devices for each of the multiple image processing devices, notifying the multiple image processing devices of the respective determined target values, and modifying the radio field strengths of the radio waves emitted from the multiple image processing devices.

* * * * *